(12) United States Patent
Fujihara et al.

(10) Patent No.: US 8,951,686 B2
(45) Date of Patent: Feb. 10, 2015

(54) FUEL PROCESSING APPARATUS, FUEL CELL SYSTEM INCLUDING FUEL PROCESSING APPARATUS, AND METHOD FOR OPERATING FUEL PROCESSING APPARATUS

(75) Inventors: Seiji Fujihara, Osaka (JP); Yukimune Kani, Osaka (JP); Tomoyuki Nakajima, Hyogo (JP); Hidenobu Wakita, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 567 days.

(21) Appl. No.: 12/919,174

(22) PCT Filed: Jan. 27, 2010

(86) PCT No.: PCT/JP2010/000473
§ 371 (c)(1),
(2), (4) Date: Aug. 24, 2010

(87) PCT Pub. No.: WO2010/087167
PCT Pub. Date: Aug. 5, 2010

(65) Prior Publication Data
US 2010/0323257 A1    Dec. 23, 2010

(30) Foreign Application Priority Data
Jan. 27, 2009  (JP) .................. 2009-014946

(51) Int. Cl.
*H01M 8/06* (2006.01)
*H01M 8/04* (2006.01)

(52) U.S. Cl.
USPC .......................... 429/429; 429/423

(58) Field of Classification Search
USPC .............. 429/423, 428, 429, 443, 433; 422/5, 422/113, 625; 423/651
See application file for complete search history.

(56) References Cited

U.S. PATENT DOCUMENTS 7,419,518 B2 * 9/2008 Ukai et al. .................. 48/127.9
2004/0037761 A1  2/2004 Maenishi et al.
(Continued)

FOREIGN PATENT DOCUMENTS

EP       1557395 A2    7/2005
JP       2000-095504   4/2000
(Continued)

OTHER PUBLICATIONS

Extended European Search Report issued in corresponding European Application No. 10735639.6, dated Dec. 2, 2013.
(Continued)

*Primary Examiner* — Ula C. Ruddock
*Assistant Examiner* — Thomas H. Parsons
(74) *Attorney, Agent, or Firm* — McDermott Will & Emery LLP

(57) ABSTRACT

A fuel processing apparatus includes: a reformer; a raw material supplying unit for supplying a raw material to the reformer and blocking the supply of the raw material; a steam supplying unit for supplying steam to the reformer and blocking the supply of the steam; a closing device for blocking a gas passage located downstream of the reformer; and a controller. The controller seals the reformer by blocking the supply of the raw material from the raw material supplying unit and the supply of the steam from the steam supplying unit and closing the closing device, and performs a pressure compensation operation by using both the supply of the steam from the steam supplying unit and the supply of the raw material from the raw material unit as pressure in the reformer decreases due to a temperature decrease.

13 Claims, 22 Drawing Sheets

(56) References Cited

U.S. PATENT DOCUMENTS

| | | | |
|---|---|---|---|
| 2009/0087701 A1 | 4/2009 | Kuwaba | |
| 2010/0047636 A1 | 2/2010 | Tamura et al. | |
| 2010/0062294 A1 | 3/2010 | Tamura | |

FOREIGN PATENT DOCUMENTS

| | | | |
|---|---|---|---|
| JP | 2003-306309 | | 10/2003 |
| JP | 2003306309 | * | 10/2003 |
| JP | 2004-307236 | | 11/2004 |
| JP | 2005-206414 | | 8/2005 |
| JP | 2005243330 | * | 9/2005 |
| JP | 2007-254251 | | 10/2007 |
| JP | 2008-074654 | | 4/2008 |
| JP | 2008-303134 A | | 12/2008 |
| WO | WO 2007/145321 A1 | | 12/2007 |
| WO | 2008-035776 A1 | | 3/2008 |

OTHER PUBLICATIONS

Extended European Search Report issued in European Application No. 10761391.1, dated Dec. 5, 2013.

* cited by examiner

FUEL PROCESSING APPARATUS, FUEL CELL SYSTEM INCLUDING FUEL PROCESSING APPARATUS, AND METHOD FOR OPERATING FUEL PROCESSING APPARATUS

RELATED APPLICATIONS

This application is the U.S. National Phase under 35 U.S.C. §371 of International Application No. PCT/JP2010/000473, filed on Jan. 27, 2010, which in turn claims the benefit of Japanese Application No. 2009-014946, filed on Jan. 27, 2009, the disclosures of which Applications are incorporated by reference herein.

TECHNICAL FIELD

The present invention is directed to a fuel processing apparatus configured to generate a hydrogen-containing gas by a reforming reaction between a raw material and moisture, a fuel cell system including the fuel processing apparatus, and a method for operating the fuel processing apparatus.

BACKGROUND ART

In many cases, a hydrogen-containing gas is used as a fuel gas when a fuel cell power generating system generates electric power. Generally, a fuel processing apparatus configured to generate the hydrogen-containing gas by utilizing steam reforming is attached to the fuel cell power generating system.

The fuel processing apparatus includes a reformer configured to generate the hydrogen-containing gas by a steam-reforming reaction and a heater configured to supply heat necessary for the steam-reforming reaction. A reforming catalyst, such as a precious metal based catalyst or a Ni based catalyst, is used in the reformer. Examples of the precious metal based catalyst are platinum, ruthenium, and rhodium. A hydrocarbon based raw material, such as a natural gas, LPG naphtha, gasoline, or kerosene, or an alcohol based raw material, such as methanol, and moisture are supplied to the reformer. Then, the reformer is heated by the heater to a temperature suitable for the steam-reforming reaction, and the steam-reforming reaction occurs at the reforming catalyst. Thus, the reformer generates the hydrogen-containing gas.

In this steam-reforming reaction, carbon monoxide (hereinafter referred to as "CO") that is about 10 to 15% (dry gas base) of the hydrogen-containing gas is generated as a subcomponent. The CO poisons a catalyst used in an electrode of a fuel cell to deteriorate an electric power generating ability. Therefore, in order to reduce a CO concentration of the hydrogen-containing gas, a shift converter and a CO remover are attached to the fuel processing apparatus. For example, a precious metal based catalyst, a Cu—Zn based catalyst, or a Fe—Cr based catalyst is used in the shift converter. Examples of the precious metal based catalyst are platinum, ruthenium, and rhodium. The shift converter is controlled to a temperature (shift reaction temperature) suitable for a shift reaction and causes the shift reaction between the CO and steam to generate hydrogen and carbon dioxide. In many cases, the CO concentration of a reformed gas is reduced to about 0.5% or lower. The CO remover carries out a CO oxidation reaction by using air supplied thereto. With this, the CO concentration of the reformed gas is reduced to preferably 10 ppm or lower. The precious metal based catalyst, such as platinum, ruthenium, or rhodium, is used as the catalyst.

In order to improve an energy efficiency by using the fuel cell power generating system at home, it is desirable to start up or stop the fuel cell power generating system in accordance with home electric power load and heat load. Here, the reformer is operated at about 650° C. Therefore, when the reformer stops, the temperature thereof decreases, and the internal pressure thereof decreases. When the internal pressure of the reformer decreases to a negative pressure with respect to an atmospheric pressure, the air may get into the reformer from outside. As a result, in the case of using the Cu—Zn based catalyst as the shift catalyst, the air may get into the reformer, and this decreases an activity. Therefore, a method for preventing the air from getting into the reformer while the reformer stops is required.

Here, proposed is a method for preventing the air from getting into the reformer by supplying the raw material to the reformer to maintain the internal pressure of the reformer when the internal pressure decreases (see PTL 1, for example).

CITATION LIST

Patent Literature

PTL1: Japanese Laid-Open Patent Application Publication No. 2004-307236

SUMMARY OF INVENTION

Technical Problem

However, as in a hydrogen generating system disclosed in PTL 1, in a case where pressure compensation is executed by using the material gas, and the internal temperature of the reformer is within a temperature range in which carbon deposition occurs, carbon may be deposited on the reforming catalyst from the raw material.

The present invention was made to solve the above problems, and an object of the present invention is to provide a fuel processing apparatus, a fuel cell system including the fuel processing apparatus, and a method for operating the fuel processing apparatus, each of which is capable of suppressing the carbon deposition from the raw material than before in a pressure compensation operation carried out while the fuel processing apparatus stops.

Solution to Problem

To solve the above problems, a fuel processing apparatus according to the present invention includes: a reformer including a reforming catalyst which causes a reforming reaction between a raw material and steam to generate a hydrogen-containing gas; a raw material supplying unit configured to supply the raw material through a raw material supplying passage to the reformer and block supply of the raw material; a steam supplying unit configured to supply the steam through a steam supplying passage to the reformer and block supply of the steam; a closing device configured to block a gas passage located downstream of the reformer; and a controller configured to, while the fuel processing apparatus stops, seal the reformer by blocking the supply of the raw material from the raw material supplying unit and the supply of the steam from the steam supplying unit and closing the closing device, and carry out a pressure compensation operation by using both the supply of the steam from the steam supplying unit and the supply of the raw material from the raw material supplying unit with respect to pressure decrease of the sealed reformer, the pressure decrease being caused by temperature decrease.

Moreover, in the fuel processing apparatus according to the present invention, the controller may be configured to execute both the supply of the steam from the steam supplying unit and the supply of the raw material from the raw material supplying unit as the pressure compensation operation with respect to the pressure decrease of the sealed reformer, the pressure decrease being caused by the temperature decrease.

Moreover, in the fuel processing apparatus according to the present invention, the controller may be configured to repeatedly execute the pressure compensation operation each time the pressure decrease of the reformer occurs, and regarding the pressure compensation operation executed repeatedly, the controller may be configured to carry out not only the pressure compensation operation by using both the supply of the steam from the steam supplying unit and the supply of the raw material from the raw material supplying unit but also at least one of the pressure compensation operation by using only the supply of the steam from the steam supplying unit and the pressure compensation operation by using only the supply of the raw material from the raw material supplying unit.

Moreover, in the fuel processing apparatus according to the present invention, the controller may be configured to repeatedly execute the pressure compensation operation each time the pressure decrease of the reformer occurs, and regarding the pressure compensation operation executed repeatedly, the controller may be configured to use both the pressure compensation operation by only the supply of the steam from the steam supplying unit and the pressure compensation operation by only the supply of the raw material from the raw material supplying unit.

Moreover, in the fuel processing apparatus according to the present invention, the controller may be configured to, at least a temperature at which deposition of carbon of the raw material occurs on the reforming catalyst, carry out the pressure compensation operation by using both the supply of the raw material from the raw material supplying unit and the supply of the steam from the steam supplying unit with respect to the pressure decrease of the sealed reformer, the pressure decrease being caused by the temperature decrease.

Moreover, the fuel processing apparatus according to the present invention may further include a depressurizing device configured to release a part of steam pressure, supplied to the reformer, to an atmosphere during the supply of the steam from the steam supplying unit.

Moreover, the fuel processing apparatus according to the present invention may further include: a combustor configured to heat the reformer; an air supplying device configured to supply combustion air to the combustor; and a discharging passage through which a gas discharged from the depressurizing device flows, the discharging passage being communicated with the combustor, wherein the controller may activate the air supplying device during the supply of the steam from the steam supplying unit.

Moreover, the fuel processing apparatus according to the present invention may further include: a deodorizer provided on the raw material supplying passage and configured to remove an odorous component in the raw material; and a check valve provided downstream of the deodorizer on the raw material supplying passage.

Moreover, the fuel processing apparatus according to the present invention may further include: a deodorizer provided on the raw material supplying passage and configured to remove an odorous component in the raw material; and a solenoid valve provided downstream of the deodorizer on the raw material supplying passage, wherein the solenoid valve may be configured such that a valve body thereof contacts a valve seat thereof when an internal pressure of the reformer increases.

Moreover, in the fuel processing apparatus according to the present invention, the reforming catalyst may contain an Ni element as a catalyst metal.

Further, in the fuel processing apparatus according to the present invention, the raw material may contain a hydrocarbon having two or more carbons.

Moreover, a fuel cell system according to the present invention includes: the fuel processing apparatus; and a fuel cell configured to generate electric power using the hydrogen-containing gas supplied from the fuel processing apparatus.

Moreover, a method for operating a fuel processing apparatus according to the present invention is a method for operating a fuel processing apparatus, the fuel processing apparatus including: a reformer including a reforming catalyst which causes a reforming reaction between a raw material and steam to generate a hydrogen-containing gas; a raw material supplying unit configured to supply the raw material through a raw material supplying passage to the reformer and block supply of the raw material; a steam supplying unit configured to supply the steam through a steam supplying passage to the reformer and block supply of the steam; and a closing device configured to block a gas passage located downstream of the reformer, the method comprising the steps of: (a) sealing the reformer by blocking the supply of the raw material from the raw material supplying unit to the reformer and the supply of the steam from the steam supplying unit to the reformer and closing the closing device; and (b) carrying out a pressure compensation operation by using both the supply of the steam from the steam supplying unit and the supply of the raw material from the raw material supplying unit with respect to pressure decrease of the sealed reformer, the pressure decrease being caused by temperature decrease after Step (a).

The above object, other objects, features, and advantages of the present invention will be made clear by the following detailed explanation of preferred embodiments with reference to the attached drawings.

Advantageous Effects of Invention

In accordance with the fuel processing apparatus, fuel cell system including the fuel processing apparatus, and method for operating the fuel processing apparatus of the present invention, the carbon deposition on the reforming catalyst by, for example, the thermal decomposition of the raw material is suppressed than before in the pressure compensation operation carried out while the fuel processing apparatus stops.

DESCRIPTION OF EMBODIMENTS

Hereinafter, preferred embodiments of the present invention will be explained in reference to the drawings. In all the drawings, the same reference signs are used for the same or corresponding components, and a repetition of the same explanation is avoided. In addition, in all the drawings, only components necessary for explaining the present invention are shown, and the other components are omitted. Further, the present invention is not limited to the following embodiments.

Embodiment 1

Configuration of Fuel Processing Apparatus

Figure 1:
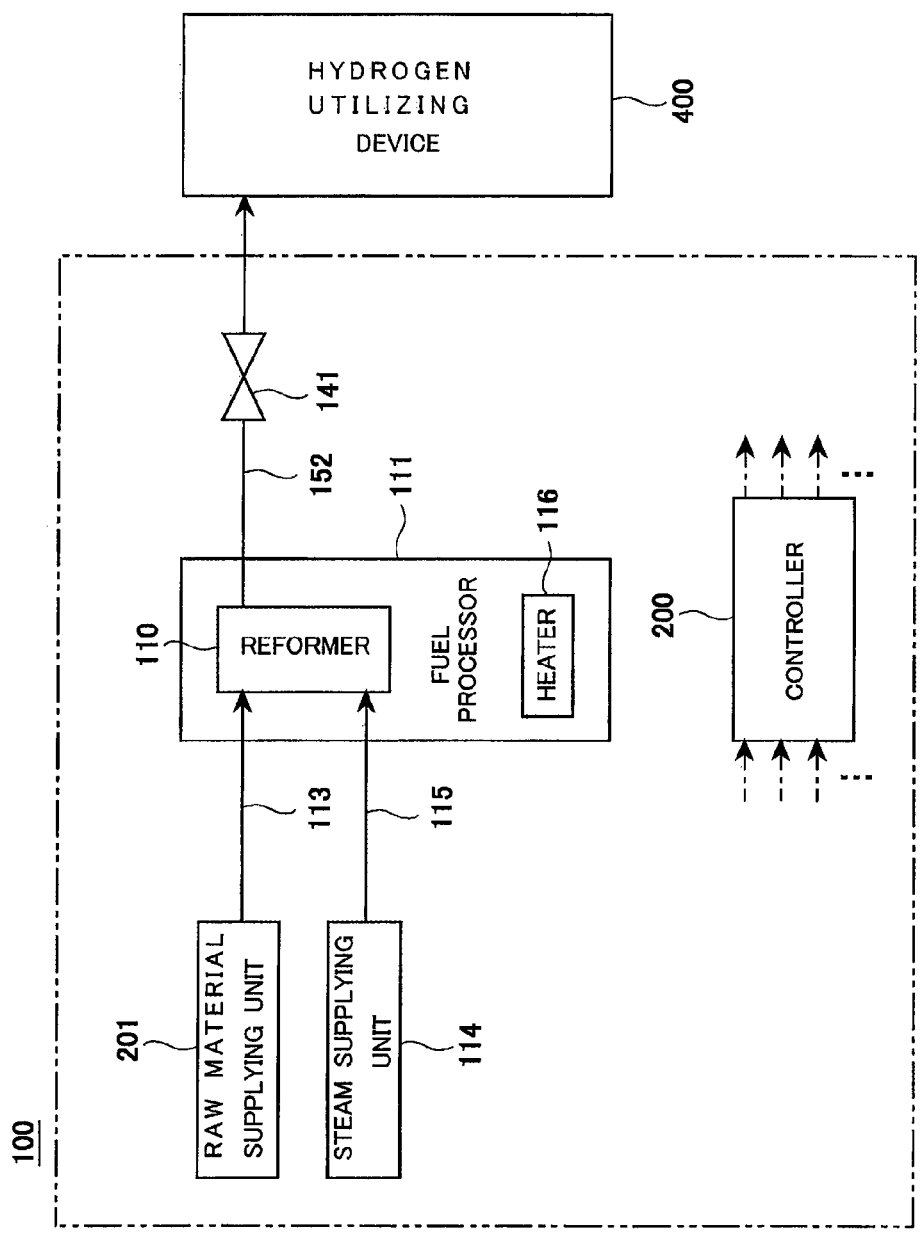
FIG. 1 is a schematic diagram showing a schematic configuration of a fuel processing apparatus according to Embodiment 1 of the present invention.

FIG. 1 is a schematic diagram showing a schematic configuration of a fuel processing apparatus according to Embodiment 1 of the present invention.

As shown in FIG. 1, a fuel processing apparatus 100 according to Embodiment 1 of the present invention includes: a reformer 110 having a reforming catalyst which causes a reforming reaction between a raw material and steam to generate a hydrogen-containing gas; a raw material supplying unit 201 configured to supply the raw material through a raw material supplying passage 113 to the reformer 110 and block the supply of the raw material; a steam supplying unit 114 configured to supply the steam through a steam supplying passage 115 to the reformer 110 and block the supply of the steam; a third closing device (closing device) 141 configured to block a gas passage 152 located downstream of the reformer 110, and a controller 200. Moreover, a fuel processor 111 includes the reformer 110 and a combustor 116. Then, the fuel processing apparatus 100 supplies the hydrogen-containing gas, generated by the fuel processor 111, through the gas passage 152 to a hydrogen utilizing device 400.

Then, the controller 200 is configured to block the supply of the raw material from the raw material supplying unit 201 and the supply of the steam from the steam supplying unit 114, close the third closing device 141, and carry out pressure compensation by using both the supply of the steam from the steam supplying unit 114 and the supply of the raw material from the raw material supplying unit 201 with respect to pressure decrease of the reformer 110, the pressure decrease being caused by temperature decrease after the third closing device 141 is closed.

Here, the raw material may be any material as long as the hydrogen-containing gas can be generated by the reforming reaction between the raw material and the steam. Used as the raw material is a material containing an organic compound having at least carbon and hydrogen as constituent elements. Examples are hydrocarbons, such as ethane and propane, and alcohol based raw materials, such as methanol. The above raw material may contain hydrocarbon having two or more carbons. Examples of the hydrocarbon having two or more carbons are ethane and propane.

For example, the reforming catalyst is a material which catalyzes the steam-reforming reaction generating the hydrogen-containing gas from the raw material and the steam. Used as the reforming catalyst is a ruthenium based catalyst in which a catalyst carrier, such as alumina, supports ruthenium (Ru), a nickel based catalyst in which the catalyst carrier supports nickel (Ni), or the like. In order to reduce the cost, it is preferable that the nickel based catalyst containing a nickel element as a catalyst metal be used as the reforming catalyst.

The raw material supplying unit 201 may have any configuration as long as it supplies the raw material while adjusting the flow rate and blocks the supply of the raw material. In Embodiment 1, the raw material supplying unit 201 includes a raw material supplying device and a closing device configured to block the flow of the raw material. Although the raw material supplying unit 201 is constituted by the raw material supplying device and the closing device in Embodiment 1, the raw material supplying unit 201 is not limited to this.

The raw material supplying device may have any configuration as long as it can supply the raw material while adjusting the flow rate. For example, the raw material supplying device may be constituted by a flow rate control valve, a booster pump, or a combination of the booster pump and the flow rate control valve. The closing device may have any configuration as long as it is configured to block the flow of the raw material. For example, an on-off valve, such as a solenoid valve, can be used as the closing device.

The raw material supplying unit 201 does not have to include the closing device as long as it can block the supply of the raw material. For example, in a case where the raw material supplying device is constituted by the flow rate control valve, it can block the supply of the raw material even if the internal pressure of the reformer 110 becomes a negative pressure with respect to an atmospheric pressure. Therefore, in a case where the raw material supplying unit 201 is constituted by the flow rate control valve, the closing device may not be provided.

The steam supplying unit 114 may have any configuration as long as it can supply the steam to the reformer 110 while adjusting the flow rate and block the supply of the steam. In Embodiment 1, the steam supplying unit 114 is constituted by a flow rate adjuster configured to adjust the flow rate of water, an evaporator configured to evaporate the water, and a closing device configured to block the flow of the water or the steam. The flow rate adjuster may be constituted by a flow rate control valve, a pump, or a combination of the pump and the flow rate control valve.

The closing device may have any configuration as long as it is a device configured to block the flow of the water or steam in a passage through which the water or steam flows. For example, an on-off valve, such as a solenoid valve, can be used as the closing device.

The steam supplying unit 114 does not have to include the closing device as long as it can block the supply of the steam. For example, in a case where the flow rate adjuster of the steam supplying unit 114 is constituted by the flow rate control valve, it can block the supply of the water even if the internal pressure of the reformer 110 becomes the negative pressure with respect to the atmospheric pressure. Therefore, in a case where the steam supplying unit 114 is configured as above, the closing device may not be provided.

The heater 116 is configured to heat the reformer 110 of the fuel processor 111. For example, the heater 116 may be a combustor configured to combust a combustion gas and oxygen, or a heater, such as an electric heater.

The third closing device 141 may have any configuration as long as it is a device configured to block the flow of the gas (for example, the hydrogen-containing gas generated by the reformer 110 and the steam) in the gas passage 152. For example, an on-off valve, such as a solenoid valve, can be used as the third closing device 141.

The controller 200 may have any configuration as along as it is a device configured to control the reformer 110, the raw material supplying unit 201, the steam supplying unit 114, and the third closing device 141 in the above manner. For example, the control device 200 may be constituted by a microprocessor, a CPU, or the like. The controller 200 may be constituted by one controller or a group of a plurality of controllers which cooperate to execute the control of the fuel processing apparatus 100. Moreover, the controller 200 may include not only a calculation processing portion, such as the microprocessor or the CPU, but also a storage portion, such as a memory, and a timer portion.

The above "carry out the pressure compensation by using both the supply of the steam from the steam supplying unit 114 and the supply of the raw material from the raw material supplying unit 201" may be any operation as long as it is the execution of the pressure compensation by using both the supply of the steam from the steam supplying unit 114 to the reformer 110 and the supply of the raw material from the raw material supplying unit 201 to the reformer 110 with respect to the pressure decrease of a closed space including the sealed reformer 110, the pressure decrease being caused by the temperature decrease while the fuel processing apparatus 100 stops.

As a first mode of the pressure compensation operation with respect to the decrease of the internal pressure of the closed space including the sealed reformer 110, both the supply of the steam and the supply of the raw material are executed. Specifically, in this mode, the supply of the steam from the steam supplying unit 114 to the reformer 110 and the supply of the raw material from the raw material supplying unit 201 to the reformer 110 may be executed at the same time or may be executed in order. In the case of executing the supply of the steam and the supply of the raw material in order, it is preferable that the supply of the steam be executed after the supply of the raw material. This is because, for example, in a case where the steam supplying unit 114 includes an evaporator configured to evaporate the water, and the evaporator is supplied with the water and evaporates the water into the steam to supply the steam to the reformer 110, the internal pressure of the reformer 110 may excessively increase, and the supply of the raw material from the raw material supplying unit 201 may become difficult.

Here, the inside of the reformer 110 is high in temperature. Therefore, in a case where a liquid raw material, such as methanol, is used as the raw material to be supplied, and the liquid raw material is supplied into the reformer 110, the liquid raw material is evaporated and supplied as a gas. Moreover, the pressure compensation operation of the first mode is executed more than once with respect to the decrease of the internal pressure. In the case of carrying out the pressure compensation operation plural times, the pressure compensation operation is repeatedly executed each time the internal pressure of the closed space including the sealed reformer 110 decreases. Moreover, the ratio of the supply amount of the raw material and the supply amount of the steam in the first mode is suitably set based on the type of the catalyst used in the reformer 110, the composition of a residual gas in the reformer 110 when the reformer 110 is sealed, the temperature of the reformer 110 during the pressure compensation operation, and the like such that the carbon is not deposited on the reforming catalyst of the reformer 110.

Moreover, as a second mode of the pressure compensation operation with respect to the decrease of the internal pressure of the closed space including the sealed reformer 110, both a first pressure compensation operation of executing only the supply of the raw material from the raw material supplying unit 201 and a second pressure compensation operation of executing only the supply of the steam from the steam supplying unit 114 are executed. Specifically, among the pressure compensation operations repeatedly executed each time the internal pressure of the closed space including the sealed reformer 110 decreases, the first pressure compensation operation is executed with respect to the decrease of the internal pressure of the closed space including the sealed reformer 110 at a predetermined timing, and the second pressure compensation operation is executed with respect to the decrease of the internal pressure of the closed space including the sealed reformer 110 at the other timing. The ratio of the execution of the first pressure compensation operation and the execution of the second pressure compensation operation among the pressure compensation operations executed repeatedly and the order of the execution of the first pressure compensation operation and the second pressure compensation operation are suitably set based on the type of the catalyst used in the reformer 110, the composition of the residual gas in the reformer 110 when the reformer 110 is sealed, the temperature of the reformer 110 during the pressure compensation operation, and the like such that the carbon is not deposited on the reforming catalyst of the reformer 110. Moreover, while the fuel processing apparatus 100 stops, the steam exists in the sealed reformer 110. Therefore, even if only the supply of the raw material from the raw material supplying unit 201 is executed, the carbon deposition on the reforming catalyst of the reformer 110 can be suppressed.

Among the pressure compensation operations repeatedly executed, the pressure compensation operation of a third mode or a fourth mode may be executed. In the pressure compensation operation of the third mode, at least one of the first pressure compensation operation and the second pressure compensation operation is executed in addition to the pressure compensation operation of the first mode. In the pressure compensation operation of the fourth mode, the pressure compensation operation of the first mode is executed in addition to the pressure compensation operation of the second mode.

The "pressure compensation operation" is an operation of, while the fuel processing apparatus 100 stops, supplying the gas into the closed space including the sealed reformer 110 to compensate the pressure decrease of the closed space, the pressure decrease being caused by the temperature decrease. In the pressure compensation operation, it is unnecessary to completely compensate the decreased pressure by supplying the gas. The pressure compensation operation may be any operation as long as the gas is supplied to compensate at least a part of the decreased pressure such that the internal pressure of the closed space does not exceed a withstanding negative pressure limit value of the fuel processor 111. More specifically, in a case where the internal pressure of the closed space including the reformer 110 becomes equal to or lower than a first pressure threshold which is higher than the withstanding negative pressure limit value of the fuel processor 111, the gas (the raw material or the steam) is supplied into the closed space including the reformer 110 such that the internal pressure of the closed space becomes equal to or higher than a second threshold which is higher than the first pressure threshold.

Method for Operating Fuel Processing Apparatus

Next, the method for operating the fuel processing apparatus 100 according to Embodiment 1 will be explained in reference to FIG. 2. The following will explain the pressure compensation operation carried out while the fuel processing apparatus 100 stops. Since a hydrogen-containing gas generating operation of the fuel processing apparatus 100 according to Embodiment 1 is carried out in the same manner as the hydrogen-containing gas generating operation of the common fuel processing apparatus 100, an explanation thereof is omitted.

Figure 2:
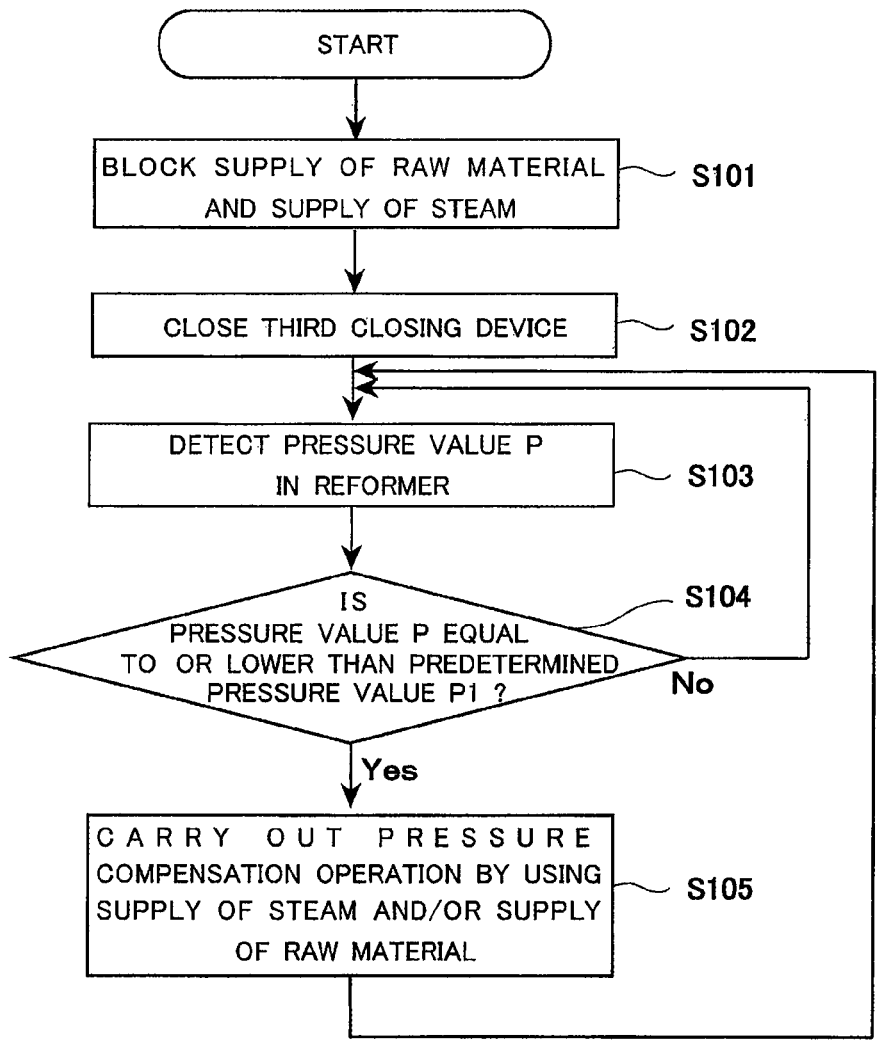
FIG. 2 is a flow chart schematically showing a pressure compensation operation carried out while the fuel processing apparatus according to Embodiment 1 stops.

FIG. 2 is a flow chart schematically showing the pressure compensation operation carried out while the fuel processing apparatus 100 according to Embodiment 1 stops.

First, the fuel processing apparatus 100 is carrying out the hydrogen-containing gas generating operation. For example, when an operation stop request is input by a user, the controller 200 outputs a stop command.

Then, as shown in FIG. 2, when stopping the hydrogen-containing gas generating operation of the fuel processing apparatus 100, the raw material supplying unit 201 and the steam supplying unit 114 respectively block the supply of the raw material and the supply of the steam (Step S101), and the third closing device 141 is closed (Step S102). With this, the closed space including at least the reformer 110 is formed, and the reformer 110 is sealed (Step (a): operation of sealing the reformer 110).

Next, the controller 200 detects a pressure value P of the inside of the reformer 110 (Step S103) and determines whether or not the pressure value P of the inside of the reformer 110 detected in Step S103 is equal to or lower than a predetermined pressure value P1 (Step S104). Here, the predetermined pressure value P1 is a pressure value (first pressure threshold) which is larger than the withstanding negative pressure limit value of the fuel processor 111. For example, the predetermined pressure value P1 may be the atmospheric pressure or −1 kPa of the atmospheric pressure. In Embodiment 1, the pressure value P of the inside of the reformer 110 is directly detected by a pressure detector, not shown. However, the present embodiment is not limited to this. A value detected by a detector which indirectly detects the pressure of the inside of the reformer 110 may be used. In this case, for example, whether or not the internal pressure of the reformer 110 is decreased may be determined based on a value of a detected temperature inside the reformer 110. Or, whether or not the internal pressure of the reformer 110 is decreased may be determined based on a value of a detected elapsed time since the operation of sealing the reformer 110 or a detected elapsed time since the execution of the pressure compensation operation.

When the pressure value P of the inside of the reformer 110 is larger than the predetermined pressure value P1 No in Step S104), the controller 200 returns to Step S103. When the pressure value P becomes equal to or smaller than the predetermined pressure value P1 (Yes in Step S104), the controller 200 carries out the pressure compensation by using both the supply of the steam and the supply of the raw material (Step S105: Step (b)). Specifically, in the case of carrying out the pressure compensation by using the supply of the steam, the controller 200 activates the steam supplying unit 114. In the case of carrying out the pressure compensation by using the supply of the raw material, the controller 200 activates the raw material supplying unit 201. After the pressure compensation operation is terminated, the controller 200 returns to Step S103.

With this, in the pressure compensation operation carried out while the fuel processing apparatus stops, the carbon deposition caused by, for example, thermal decomposition of the raw material at the reforming catalyst can be suppressed than before.

The fuel processing apparatus 100 according to Embodiment 1 is configured such that the hydrogen-containing gas (reformed gas) generated in the fuel processor 111 is supplied to the hydrogen utilizing device 400. However, the present embodiment is not limited to this. The fuel processing apparatus 100 according to Embodiment 1 may be configured such that the fuel processor 111 includes a shift converter having a shift catalyst (such as a copper-zinc based catalyst) and a carbon monoxide remover having an oxidation catalyst (such as a ruthenium based catalyst) for reducing the carbon monoxide in the hydrogen-containing gas supplied from the reformer 110.

Embodiment 2

Figure 3:
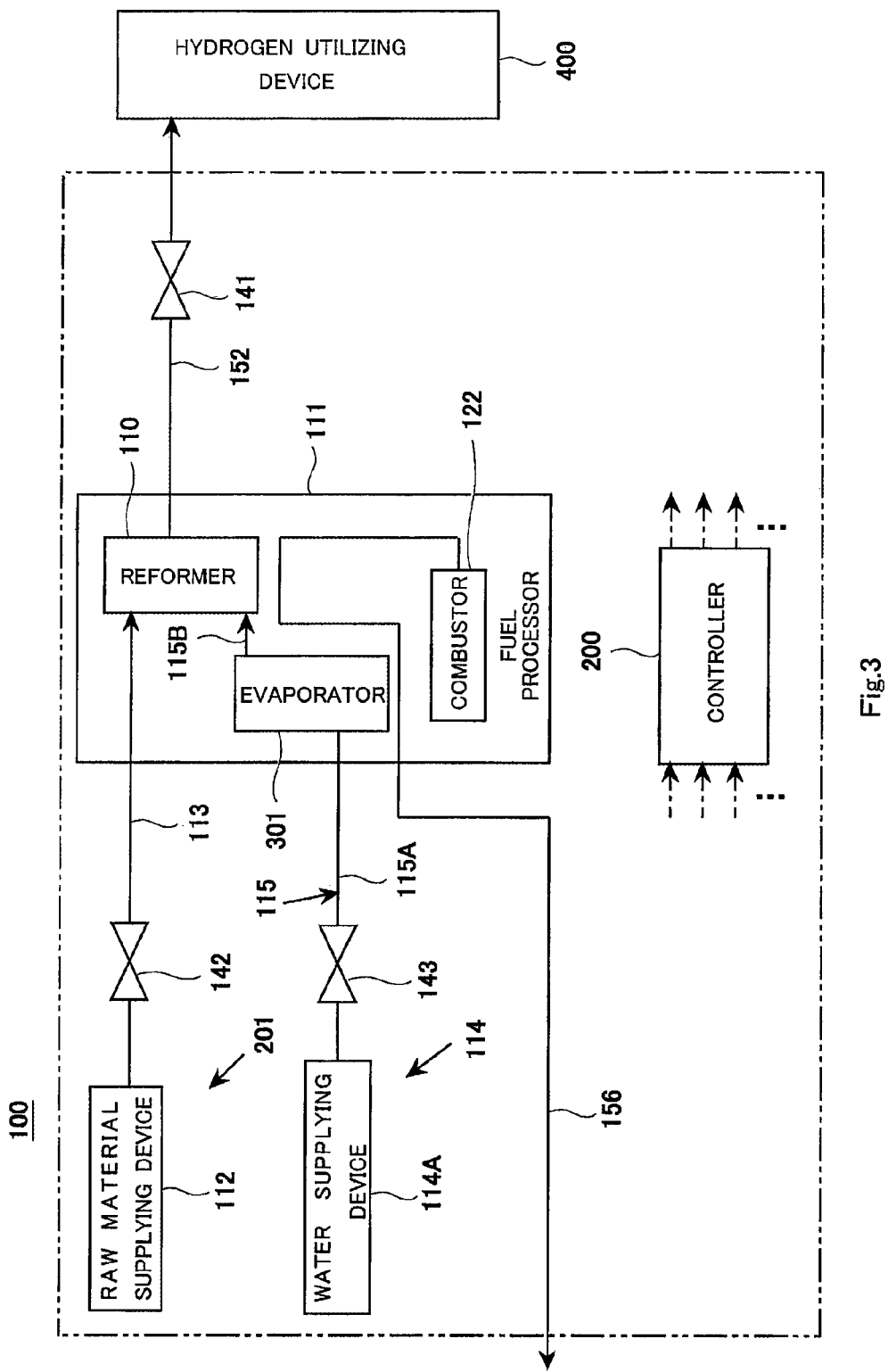
FIG. 3 is a schematic diagram showing a schematic configuration of the fuel processing apparatus according to Embodiment 2 of the present invention.
Figure 4:
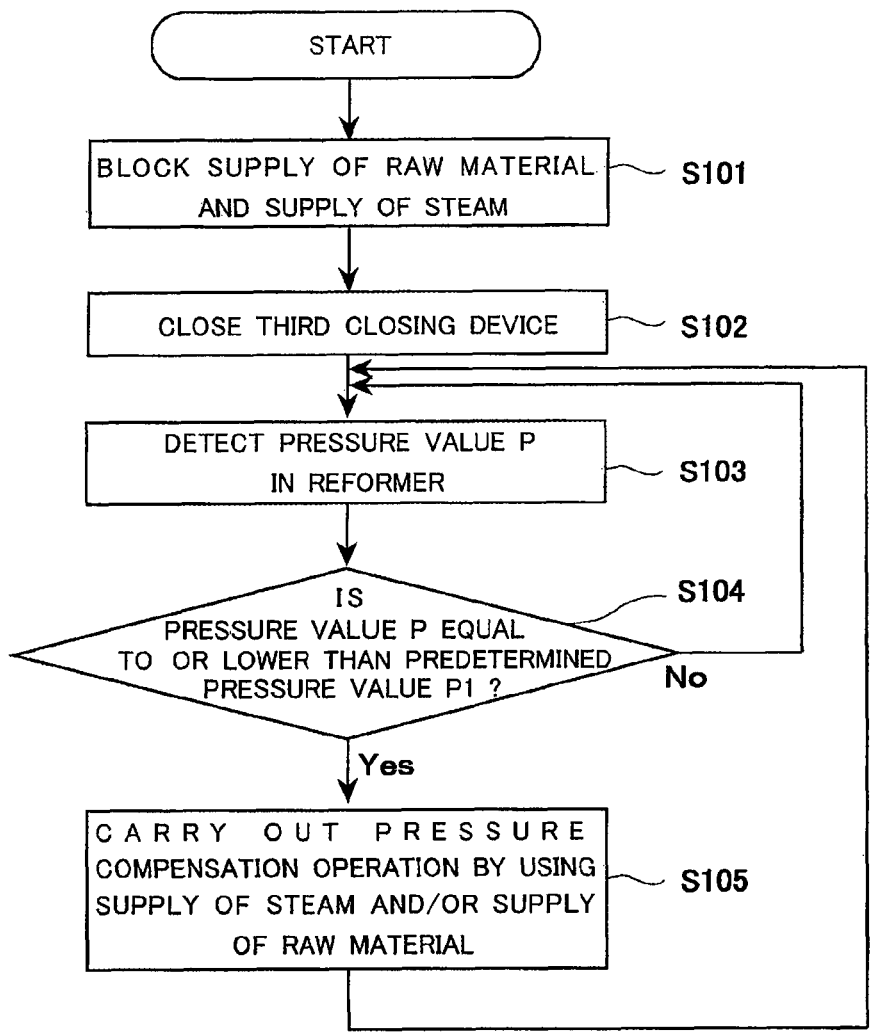
FIG. 4 is a flow chart schematically showing the pressure compensation operation carried out while the fuel processing apparatus according to Embodiment 1 stops.

FIG. 3 is a schematic diagram showing a schematic configuration of the fuel processing apparatus according to Embodiment 2 of the present invention. FIG. 4 is a flow chart schematically showing the pressure compensation operation carried out while the fuel processing apparatus according to Embodiment 1 stops.

As shown in FIG. 3, the fuel processing apparatus 100 according to Embodiment 2 of the present invention is the same in basic configuration as the fuel processing apparatus 100 according to Embodiment 1. The fuel processing apparatus 100 according to Embodiment 2 is configured such that a raw material supplying device 112 and a first closing device 142 are included as the raw material supplying unit 201, and a water supplying device 114A, a second closing device 143, and an evaporator 301 are included as the steam supplying unit 114.

The raw material supplying device 112 may have any configuration as long as it can supply the raw material while adjusting the flow rate. For example, the raw material supplying device 112 may be constituted by a flow rate control valve, a booster pump, or a combination of the booster pump and the flow rate control valve. The first closing device 142 may have any configuration as long as it can block the flow of the raw material. For example, an on-off valve, such as a solenoid valve, can be used as the first closing device 142.

For example, the water supplying device 114A is a flow rate adjuster configured to adjust the flow rate of the water. The flow rate adjuster may be constituted by a flow rate control valve, a pump, or a combination of the pump and the flow rate control valve. The evaporator 301, which has residual heat even after the hydrogen-containing gas generating operation stops, is configured to evaporate the water supplied from the water supplying device 114A and supply the steam through a steam supplying passage 115B to the reformer 110. The second closing device 143 is provided at a portion of a water supplying passage 115A. In Embodiment 2, the evaporator 301 is provided downstream of the second closing device 143 on the water supplying passage 115A. The evaporator 301 may be provided upstream of the second closing device 143.

The fuel processor 111 of the fuel processing apparatus 100 includes a combustor 122. The combustor 122 is connected to a flue gas passage 156 configured to transfer the heat through a dividing wall to the reformer 110. In addition, the flue gas passage 156 is configured to transfer the heat to the evaporator 301 by using the heat of a flue gas flowing therethrough. However, as the configuration of heating the evaporator 301, the heat may be directly transferred through the dividing wall to the evaporator 301 by using the flue gas flowing through the flue gas passage 156, or the heat may be indirectly transferred through the other component (such as a passage of the hydrogen-containing gas supplied from the reformer 110) to the evaporator 301 by using the flue gas flowing through the flue gas passage 156.

In Embodiment 2, the evaporator 301 is heated by the combustor 122. However, the present embodiment is not limited to this. For example, the evaporator 301 may be heated by a heater, such as an electric heater.

Moreover, as shown in FIG. 4, the pressure compensation operation carried out while the fuel processing apparatus 100 according to Embodiment 2 stops is the same as the pressure compensation operation carried out while the fuel processing apparatus 100 according to Embodiment 1 stops. However, since the raw material supplying unit 201 and the steam supplying unit 114 are configured as above in the fuel processing apparatus 100 according to Embodiment 2, the following will explain differences therebetween.

As shown in FIG. 4, when stopping the hydrogen-containing gas generating operation of the fuel processing apparatus 100, the raw material supplying unit 201 and the steam supplying unit 114 respectively block the supply of the raw material and the supply of the steam (Step S101). Specifically, the operation of the raw material supplying device 112 stops, and the first closing device 142 is closed. In addition, the operation of the water supplying device 114A stops, and the second closing device 143 is closed.

Then, the controller 200 carries out the pressure compensation by using both the supply of the steam and the supply of the raw material in Step S105. Specifically, in the case of carrying out the pressure compensation by using the supply of the steam, the controller 200 opens the second closing device 143 and activates the water supplying device 114A to supply the water to the evaporator 301 having the residual heat, and the steam generated in the evaporator 301 is supplied to the reformer 110. Moreover, in the case of carrying out the pressure compensation by using the supply of the raw material, the controller 200 opens the first closing device 142 and activates the raw material supplying device 112 to supply the raw material through the raw material supplying passage 113 to the reformer 110.

The fuel processing apparatus 100 according to Embodiment 2 configured as above has the same operational advantages as the fuel processing apparatus 100 according to Embodiment 1.

Embodiment 3

Configuration of Fuel Processing Apparatus 100

Figure 5:
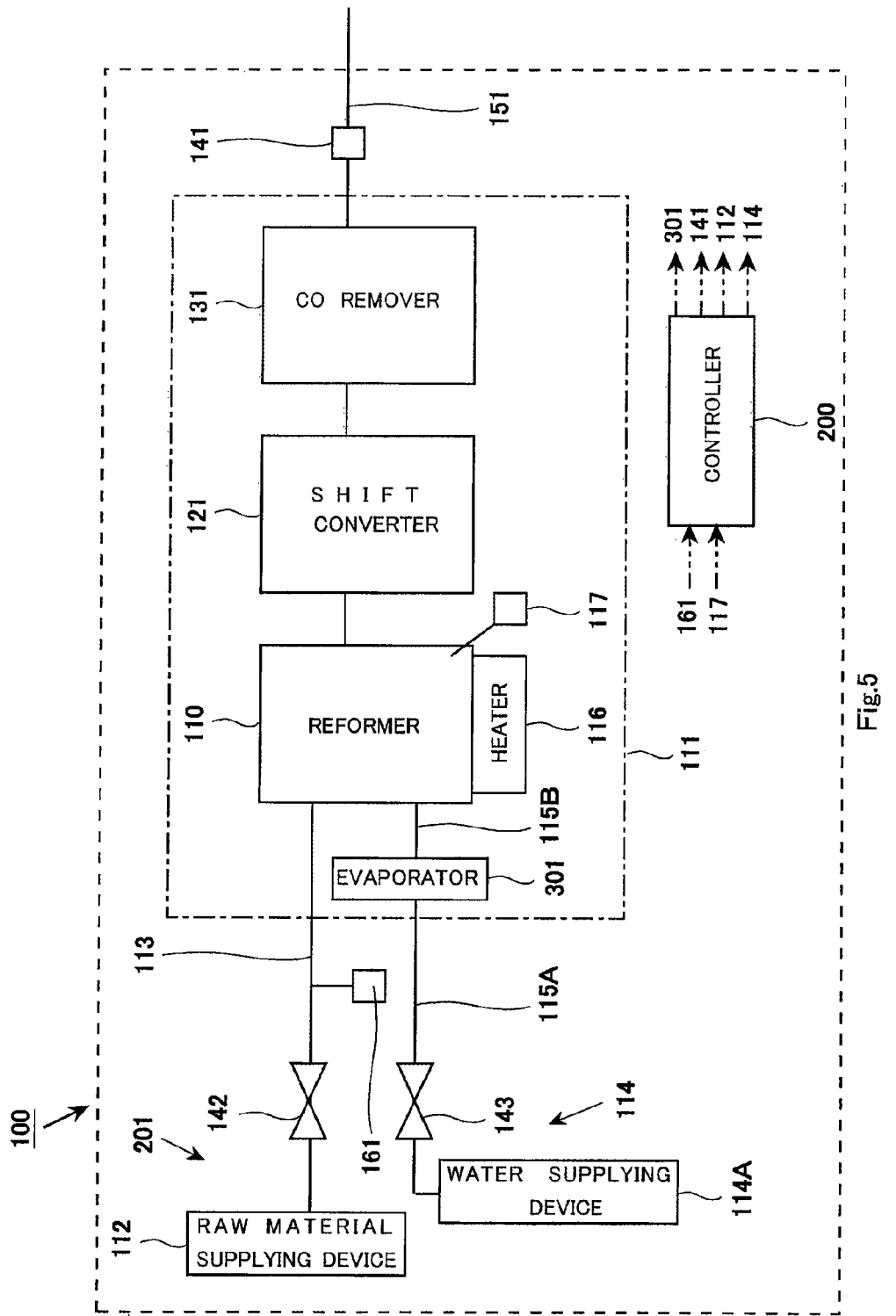
FIG. 5 is a schematic diagram showing a schematic configuration of the fuel processing apparatus according to Embodiment 3 of the present invention.

FIG. 5 is a schematic diagram showing a schematic configuration of the fuel processing apparatus 100 according to Embodiment 3 of the present invention.

As shown in FIG. 5, the fuel processing apparatus 100 of the present embodiment includes: the reformer 110 having the reforming catalyst which causes the reforming reaction between the raw material and the moisture to generate the hydrogen-containing gas; a shift converter 121 which is connected downstream of the reformer 110 in a flow direction of the hydrogen-containing gas and has the shift catalyst which causes a shift reaction between the CO in the hydrogen-containing gas and the moisture; and a CO remover 131 which is connected downstream of the shift converter 121 in the flow direction of the hydrogen-containing gas and oxidizes the CO in the hydrogen-containing gas. The shift converter 121 reduces a CO concentration of the hydrogen-containing gas by the shift reaction. After a small amount of air is added to the hydrogen-containing gas supplied from the shift converter 121, the hydrogen-containing gas is supplied to the CO remover 131. The CO remover 131 further reduces the CO concentration of the hydrogen-containing gas by the oxidation of the CO. The fuel processor 111 includes the reformer 110, the shift converter 121, the CO remover 131, and the heater 116. In addition, the evaporator 301 is provided inside the fuel processor 111.

The raw material supplying device 112 configured to supply the raw material is connected to the reformer 110. The raw material supplying device 112 includes a booster pump (not shown) configured to increase the pressure of the raw material, and the raw material is supplied from the raw material supplying device 112 through the raw material supplying passage 113 to the reformer 110. Moreover, the first closing device 142 is provided at a portion of the raw material supplying passage 113. The first closing device 142 may have any configuration as long as it is a device configured to block the flow of the raw material. For example, an on-off valve, such as a solenoid valve, can be used as the first closing device 142.

Moreover, the water supplying device 114A configured to supply the water is also connected to the reformer 110. The water supplying device 114 includes a water pump, and the steam is supplied from the water supplying device 114A through the water supplying passage 115A, the evaporator 301, and the steam passage 115B to the reformer 110. Specifically, the evaporator 301 having the residual heat even after the hydrogen-containing gas generating operation stops is configured to evaporate the water supplied from the water supplying device 114A and supply the steam through the steam supplying passage 115B to the reformer 110. The second closing device 143 is provided at a portion of the water supplying passage 115A. The second closing device 143 may have any configuration as long as it is a device configured to block the flow of the water. For example, an on-off valve, such as a solenoid valve, can be used as the second closing device 143.

Further, the reformer 110 is provided with the heater 116 configured to supply the heat necessary for the reforming reaction to the reforming catalyst and a temperature detector 117 configured to detect the temperature of the reforming catalyst. The heater 116 is configured to heat the reformer 110 and the evaporator 301. For example, the heater 116 may be constituted by a combustor or an electric heater.

In Embodiment 3, the raw material supplying device 112 and the first closing device 142 constitute the raw material supplying unit 201 configured to block the supply of the raw material to the reformer 110. Similarly, the water supplying device 114A, the second closing device 143, and the evaporator 301 constitute the steam supplying unit 114 configured to block the supply of the steam to the reformer 110.

A sealing valve (closing device) 141 is provided downstream of the CO remover 131 in the flow direction of the hydrogen-containing gas. By closing the sealing valve 141, the first closing device 142, and the second closing device 143, a space from the first closing device 142 and the second closing device 143 up to the reformer 110, the shift converter 121, and the CO remover 131 can be sealed. To be specific, the closed space including the reformer 110 is sealed.

The hydrogen-containing gas supplied from the CO remover 131 is supplied through a supplying pipe 151, located downstream of the sealing valve 141 in the flow direction of the hydrogen-containing gas, to the outside of the fuel processing apparatus (such as a fuel cell; details are not shown). During a normal operation, the CO concentration of the hydrogen-containing gas supplied from the CO remover 131 is reduced to about 10 ppm or lower by the operations of the shift converter 121 and the CO remover 131.

Moreover, a pressure detector 161 is provided on the raw material supplying passage 113. In a case where the sealing valve 141, the first closing device 142, and the second closing device 143 are closed, the pressure detector 161 can detect the pressure of the inside of the closed space including the sealed reformer 110, that is, the pressure of the inside of the space from the first closing device 142 and the second closing device 143 up to the third closing device 141.

The operations of the fuel processing apparatus 100 described above are executed by the commands from the controller 200. The controller 200 is constituted by a computer, such as a microcomputer. The controller 200 controls the operations of the raw material supplying device 112, the water supplying device 114A, and the heater 116 based on temperature information of the temperature detector 117. Thus, the controller 200 controls an operating state of the fuel processing apparatus 100. The controller 200 may be constituted by one controller or a group of a plurality of controllers which cooperate to execute control operations. The controller 200 may be configured such that a plurality of controllers are dispersively provided and cooperate to control the operation of the fuel processing apparatus 100.

In the present embodiment, a city gas infrastructure line is a supply system, and a methane gas supplied from the supply system is used as the raw material. Instead of the methane gas, the hydrocarbon based raw material, such as natural gas, LPG (liquefied petroleum gas), naphtha, gasoline, or kerosene, or the alcohol based raw material, such as methanol, may be used. Moreover, the inside of the reformer 110 is high in temperature. Therefore, in a case where the liquid raw material, such as methanol, is used and supplied into the reformer 110, the liquid raw material evaporates to be used as the gas.

Moreover, in the present embodiment, in order to reduce the cost, a Ni based catalyst is used as the reforming catalyst, a Cu—Zn based catalyst is used as the shift catalyst, and a Ru based catalyst is used as a selective oxidation catalyst. As the shift catalyst of the shift converter 121, the precious metal based catalyst, such as Pt, Ru, or Rh, or an iron (Fe)-chromium (Cr) based catalyst can also be used. Moreover, as the selective oxidation catalyst of the CO remover 131, a Pt based catalyst or a Pt—Ru based catalyst can also be used.

The heater 116 may include: a burner configured to burn a combustible gas, such as the raw material and the hydrogen-containing gas; an igniter; a gas supplying device, such as a fan or a pump, configured to supply an oxidation gas, such as air (details are not shown). Regarding the adjustment of conditions for supplying the heat to the reformer 110, the reformer 110 may be heated to a temperature (reforming reaction temperature) suitable for the steam-reforming reaction by adjusting the supply amount of the combustible gas.

Operation of Fuel Processing Apparatus 100

Next, the normal operation of the fuel processing apparatus 100 of the present embodiment will be explained. The following operations are executed by the command from the controller 200.

During the normal operation, the raw material supplying device 112 and the water supplying device 114A respectively supply the raw material and the water to the reformer 110 such that a mole ratio (S/C, steam carbon ratio) of the raw material and the water becomes, for example, three. Moreover, the heater 116 is controlled such that the temperature detected by the temperature detector 117 becomes, for example, 650° C.

The reformer 110 uses the raw material and the water to generate the reformed gas containing hydrogen as a major component. About 10% (gas concentration of dry gas base) of the reformed gas is the CO. Therefore, after the reformed gas passes through the shift converter 121 and the CO remover 131, and the CO is reduced to 10 ppm or lower, the reformed gas is supplied to, for example, the fuel cell located outside the fuel processing apparatus 100.

Next, a method (operation) for stopping the fuel processing apparatus 100 of Embodiment 3 will be explained.

Figure 6:
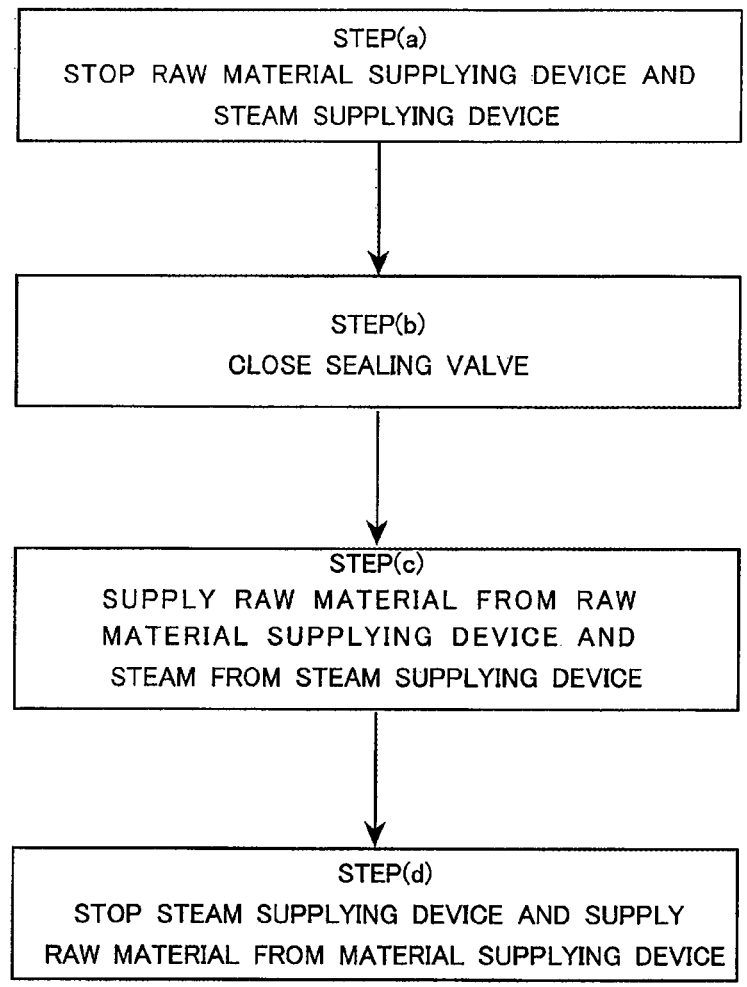
FIG. 6 is a schematic diagram showing steps of a method for stopping the fuel processing apparatus according to Embodiment 3 of the present invention.
Figure 7:
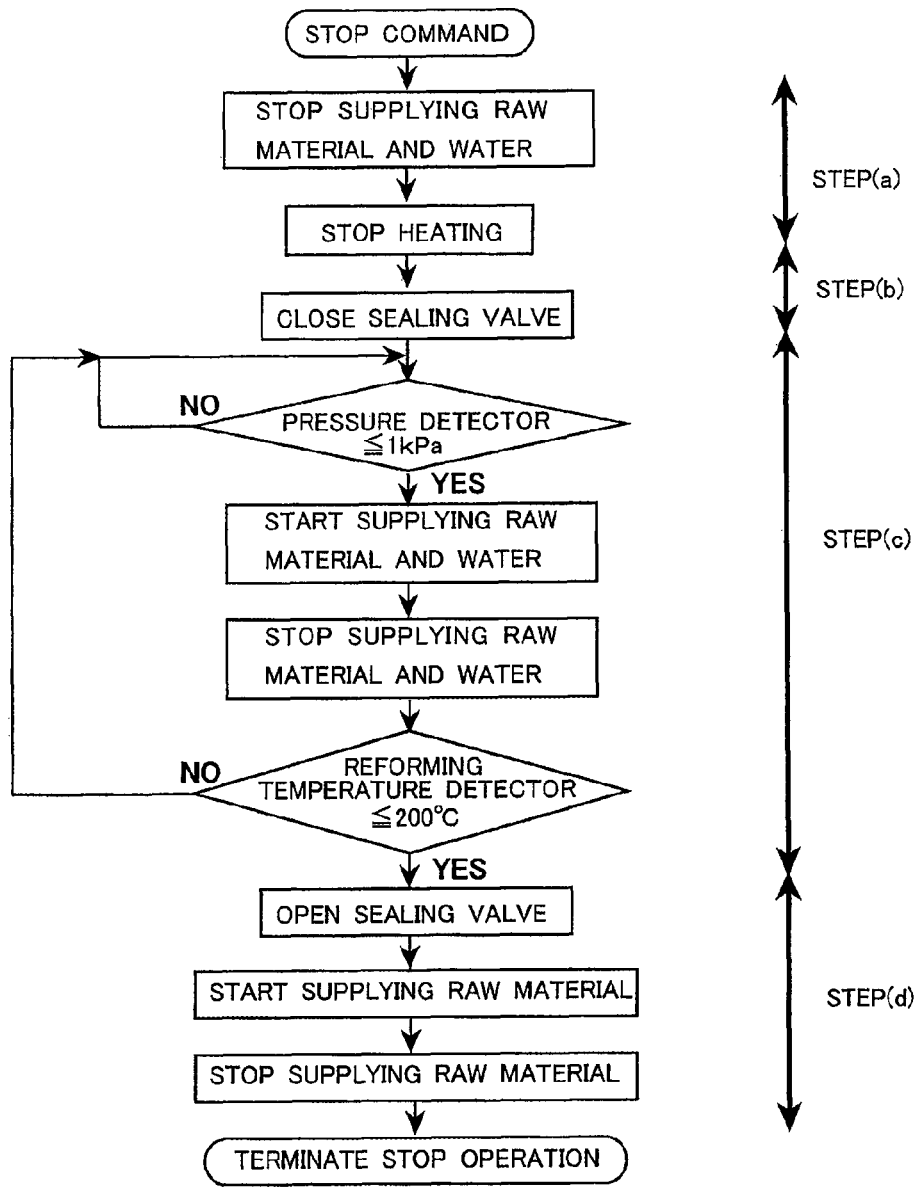
FIG. 7 is a flow chart showing the method for stopping the fuel processing apparatus according to Embodiment 3 of the present invention.

FIG. 6 is a schematic diagram showing steps of the method for stopping the fuel processing apparatus according to Embodiment 3 of the present invention. FIG. 7 is a flow chart showing the method for stopping the fuel processing apparatus according to Embodiment 3 of the present invention.

Steps (a), (b), (c), and (d) are sequentially carried out in accordance with a process chart of the stopping method shown in FIG. 6. Further, a specific flow of the stopping method will be explained in reference to FIG. 7.

(a) Step of Stopping Raw Material Supplying Device 112 and Water Supplying Device 114A (Step of Blocking Supply of Raw Material and Steam to Reformer 110)

First, in order to stop (block) the supply of the hydrogen from the fuel processing apparatus 100 to the outside in accordance with the stop command, the raw material supplying device 112 and the water supplying device 114 stop operating to stop generating the hydrogen. At this time, the heater 116 stops heating. With this, the supply of the raw material and the steam to the reformer 110 is blocked.

(b) Step of Closing Sealing Valve 141 (Step of Closing Closing Device to Seal Reformer 110)

Next, the sealing valve 141 is closed, and the space from the raw material supplying device 112 and the water supplying device 114 up to the CO remover 131 is sealed. Thus, the space is blocked from outside air.

(c) Step of Supplying Raw Material from Raw Material Supplying Device 112 and Water from Water Supplying Device 114 (Step of Carrying Out Pressure Compensation by Using Both Supply of Steam from Steam Supplying Unit and Supply of Raw Material from Raw Material Supplying Unit)

By closing the sealing valve 141, the reformed gas mainly consisted of hydrogen remains inside the fuel processing apparatus 100. After the heater 116 stops, the temperature of the remaining reformed gas decreases, and the volume of the remaining reformed gas contracts. Therefore, the internal pressure decreases and becomes the negative pressure with respect to the atmospheric pressure. The outside air may flow into the fuel processing apparatus 100 depending on the performance of the sealing valve 141. Therefore, Cu of the Cu—Zn catalyst of the shift catalyst may be oxidized, and the catalytic activity may deteriorate.

Therefore, in Step (c), a pressure (gage pressure) of the inside of the fuel processing apparatus 100 with respect to the atmospheric pressure is detected by using the pressure detector 161. A lower limit is preset for the pressure detected by the pressure detector 161. In Embodiment 2, in order to prevent the pressure from becoming the negative pressure with respect to the atmospheric pressure, the preset pressure is set to +1 kPa with respect to the atmospheric pressure. Then, when the pressure detected by the pressure detector 161 becomes equal to or lower than +1 kPa with respect to the atmospheric pressure, the raw material supplying device 112 and the water supplying device 114A operate for a certain period of time to supply the raw material and the water, thereby increasing the pressure of the inside of the fuel processing apparatus 100. After the pressure increases, the raw material supplying device 112 and the water supplying device 114A stop.

After that, when the temperature inside the fuel processing apparatus 100 decreases, and the pressure detected by the pressure detector 161 becomes equal to or lower than +1 kPa with respect to the atmospheric pressure, the same operation is repeated again, that is, the raw material supplying device 112 and the water supplying device 114A operate for a certain period of time to supply the raw material and the water, thereby increasing the pressure of the inside of the fuel processing apparatus 100.

By carrying out the above operation, the outside air can be prevented from getting into the apparatus, and the stop operation can be carried out without deteriorating the performance of the Ni based reforming catalyst.

It is desirable that a ratio of the water to the raw material be set such that the S/C becomes two or higher. This is because if the S/C is lower than two, there is a high probability that the thermal decomposition of the raw material proceeds on the Ni based catalyst, and this causes the carbon deposition.

(d) Step of Stopping Supply of Water from Water Supplying Device 114A and Supplying Raw Material from Raw Material Supplying Device 112

After Step (c), the sealing valve 141 may remain closed, and the stop operation may terminate. However, the temperature of the other component, such as the CO remover 131, may be lower than 100° C. If the moisture exists, the steam in the reformed gas may condense, and this may deteriorate the catalyst performance. In contrast, when the temperature is equal to or lower than 300° C., the performance deterioration of the reforming catalyst is unlikely to proceed even in the raw material atmosphere. However, in a case where the reforming catalyst is exposed to the atmosphere of only the raw material at high temperature (for example, 300° C. or higher), its performance deteriorates by the carbon deposition.

Here, in Embodiment 3, in a case where the temperature detected by the temperature detector 117 becomes equal to or lower than 200° C. that is a purge start temperature while repeating the supply of the raw material and the moisture, the sealing valve 141 opens, and only the raw material supplying device 112 operates in a certain period of time to supply only the raw material to the fuel processing apparatus 100 (purging operation) without supplying the water from the water supplying device 114A. The combustible gas containing the raw material discharged from the fuel processor 111 by this purging operation is combusted by the heater 116.

By this purging operation, the steam remaining in the fuel processing apparatus 100 can be purged. In addition, even in a case where the temperature becomes equal to or lower than a temperature at which the water condenses, the water condensation does not proceed on the catalyst. Therefore, the performance deterioration of the catalyst can be prevented.

Moreover, the above purge start temperature is set to a temperature at which the carbon deposition does not occur on the reforming catalyst even if the reformer 110 increases in temperature by the heating operation of the heater 116 during the purging operation. Therefore, the purge start temperature is set to a temperature which is lower than a lower limit temperature at which the carbon deposition occurs on the reforming catalyst in the raw material atmosphere. Moreover, in order to prevent the air from getting into the apparatus, it is preferable that the sealing valve 141 be closed when the stop operation is terminated.

In Step (d) of Embodiment 3, when the temperature detected by the temperature detector 117 has become the preset purge start temperature, the pressure compensation operation of maintaining the positive pressure only by the supply of the raw material without supplying the water from the water supplying device 114A may be carried out. With this, the ratio of the water to the raw material in the closed space including the reformer 110 becomes low, and the probability of occurrence of the dew condensation in the fuel processor 111 becomes low.

In the pressure compensation operation carried out immediately before the purging operation, the moisture supplied from the water supplying device 114A may remain in the reformer 110 as the water. Then, by the heating operation of the heater 116 during the purging operation, the water may evaporate late in the reformer 110. In this case, the sealing valve 141 may not be closed immediately, but the evaporated remaining water in the fuel processing apparatus may be discharged. After the pressure decreases, the sealing valve 141 may be closed. At this time, the sealing valve 141 can be closed while detecting the internal pressure by the pressure detector 161. Moreover, the timing at which the sealing valve 141 is closed can be determined based on the temperature detected by the temperature detector 117 or an elapsed time since the execution of the purging operation. In a case where a pressure relief valve (not shown) is provided, and the pressure of the inside of the fuel processing apparatus 100 increases after the sealing valve 141 is closed, the pressure may be released from the pressure relief valve.

Moreover, Embodiment 3 has explained the stop operation carried out in a case where the methane gas is used as the raw material. In a case where LPG or kerosene is used as the raw material, and the catalyst containing Ni as the major component is used as the reforming catalyst, the activity deterioration becomes more significant by the carbon deposition on the catalyst due to the supply of only the raw material. In a case where LPG or kerosene is used as the raw material, further effects can be expected by carrying out the stop operation of the fuel processing apparatus 100 as in Embodiment 3.

Embodiment 4

Next, Embodiment 4 of the present invention will be explained.

The fuel processing apparatus 100 of Embodiment 3 is used in Embodiment 4 of the present invention, so that the explanation of the configuration thereof is omitted.

Operation of Fuel Processing Apparatus 100

Figure 8:
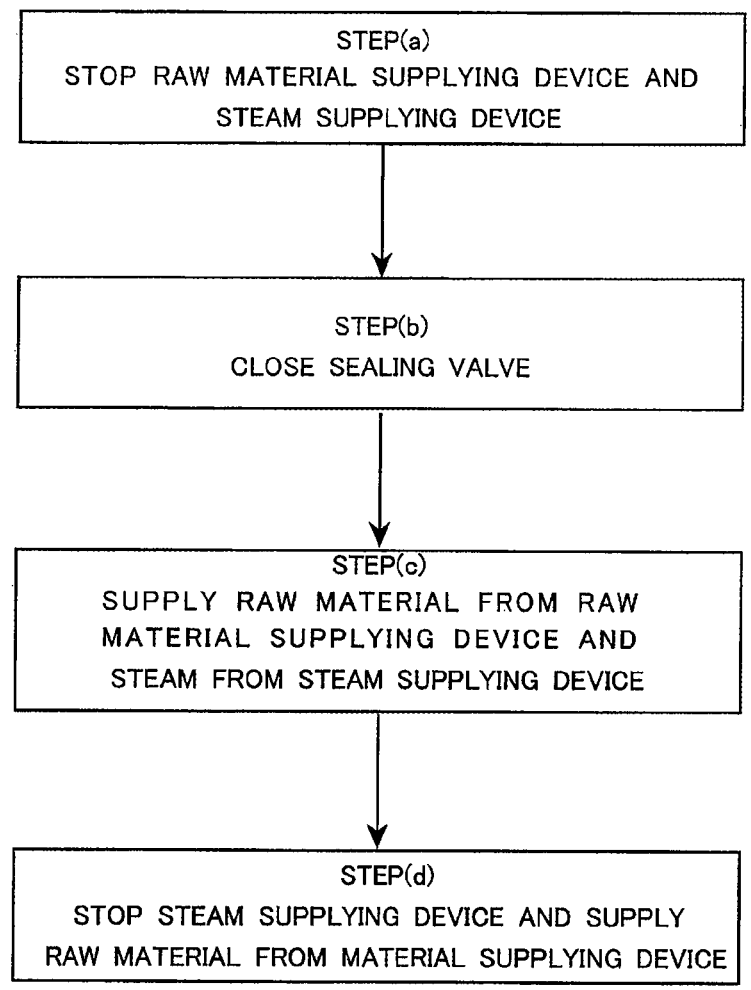
FIG. 8 is a schematic diagram showing steps of the method for stopping the fuel processing apparatus according to Embodiment 4 of the present invention.
Figure 9:
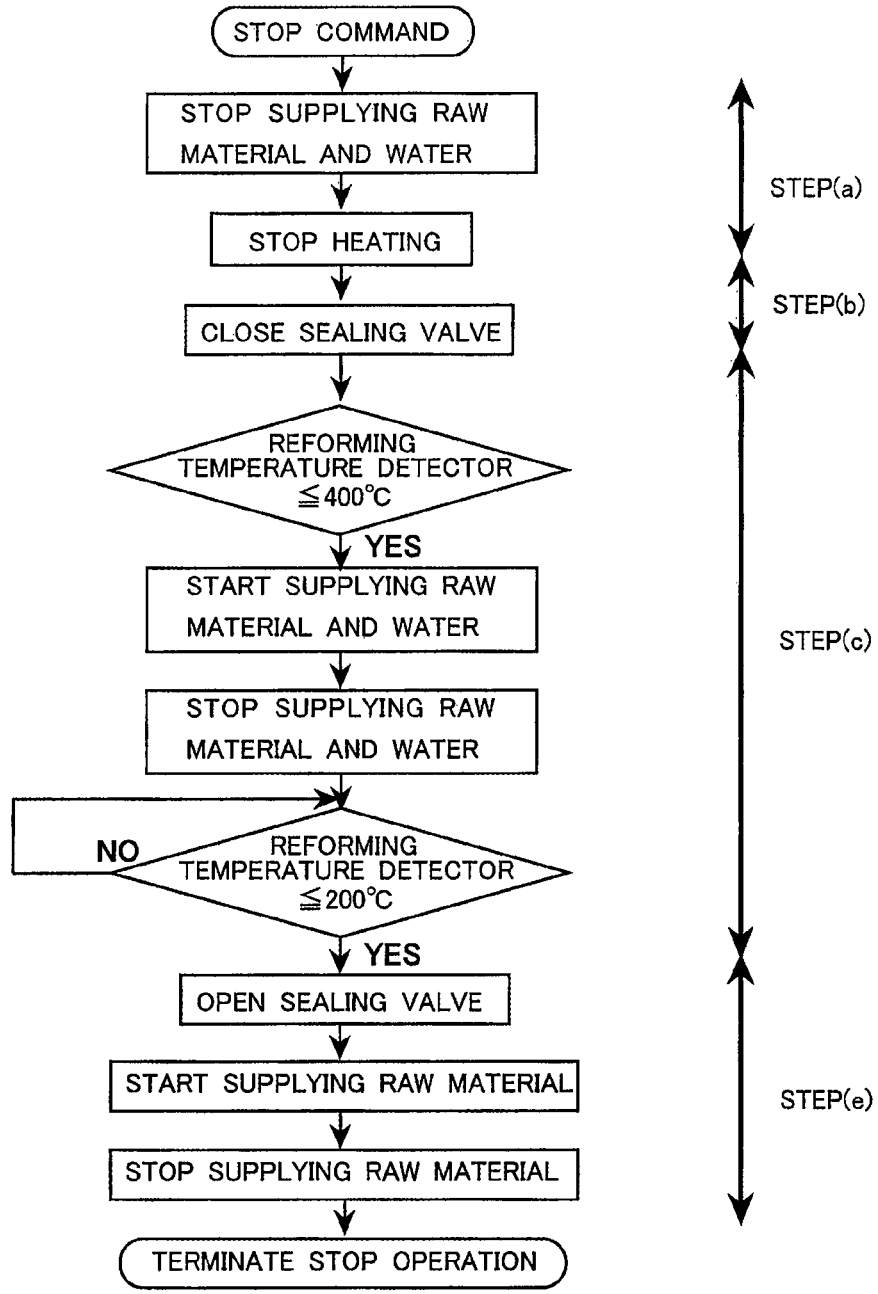
FIG. 9 is a flow chart showing the method for stopping the fuel processing apparatus according to Embodiment 4 of the present invention.

FIG. 8 is a schematic diagram showing steps of the method for stopping the fuel processing apparatus according to Embodiment 4 of the present invention. FIG. 9 is a flow chart showing the method for stopping the fuel processing apparatus according to Embodiment 4 of the present invention.

The fuel processing apparatus 100 of Embodiment 4 of the present invention sequentially carries out Steps (a), (b), (c), and (e) in accordance with the process chart of the stopping method shown in FIG. 8. The method of Embodiment 4 is substantially the same as that of Embodiment 3, and differences therebetween are the operations in Steps (c) and (e).

Hereinafter, the stop operation of the fuel processing apparatus 100 of Embodiment 4 in Steps (c) and (e) will be explained in reference to FIG. 9.

(c) Step of Supplying Raw Material from Raw Material Supplying Device 112 and Supplying Water from Water Supplying Device 114A (Step of Carrying Out Pressure Compensation by Using Both Supply of Steam from Steam Supplying Unit and Supply of Raw Material from Raw Material Unit)

In Embodiment 4, the pressure of the inside of the fuel processing apparatus 100 is estimated based on the temperature detected by the temperature detector 117. This is because, for example, in a case where the internal pressure is such that the gage pressure is 2 kPa at 400° C., the gage pressure decreases by about 1 to 2 kPa by the temperature decrease of 10° C. Here, when the temperature detector 117 detects a temperature lower than a preset pressure decrease temperature, the raw material and the water are supplied to adjust the pressure of the inside of the fuel processing apparatus 100. A preset pressure compensation start temperature is set to 400° C.

In consideration of the temperature decrease and internal pressure decrease in the fuel processing apparatus 100 and the sealing performance of the sealing valve 141, it is preferable that the pressure compensation start temperature be set to a temperature at which the pressure of the fuel processing apparatus 100 does not become the negative pressure.

Moreover, when the temperature detected by the temperature detector 117 decreases by 10° C. (indicating the temperature difference), the raw material supplying device 112 and the water supplying device 114A operate for a certain period of time to supply the raw material and the water (steam), thereby increasing the pressure of the inside of the fuel processing apparatus 100. After that, when the temperature detected by the temperature detector 117 further decreases by 10° C., the raw material supplying device 112 and the water supplying device 114A operate again for a certain period of time to supply the raw material and the water (steam), thereby increasing the pressure of the inside of the fuel processing apparatus 100. This operation may be repeated until the temperature becomes a purge start/stop temperature (for example, 200° C.).

It is preferable that the purge start temperature be 200° C. or lower and be arbitrarily set to a temperature at which the activity of the Ni-based reforming catalyst is unlikely to deteriorate even in the raw material atmosphere.

(e) Step of Stopping Supply of Water from Water Supplying Device 114A and Supplying Raw Material from Raw Material Supplying Device 112

The operation in Step (e) is substantially the same as the operation in Step (d) of Embodiment 3, but is different from the operation in Step (d) of Embodiment 3 in that Step (e) is a step in which: the supply of the raw material and the supply of the moisture are repeated; and when the temperature detected by the temperature detector 117 becomes equal to or lower than the preset purge start temperature (200° C. in Embodiment 4), the sealing valve 141 opens, and only the raw material supplying device 112 operates for a certain period of time to supply only the raw material to the fuel processing apparatus 100 (purging operation) without supplying the water from the water supplying device 114A.

In accordance with the above operation, even in a case where the pressure detector 161 is not provided, the effect of maintaining the internal pressure at the positive pressure with respect to the atmospheric pressure can be obtained by estimating the pressure of the inside of the fuel processing apparatus 100 based on the temperature change and supplying the raw material and the moisture.

The same effect can be expected by estimating the internal pressure based on the measurement of the supply amount from the raw material supplying device 112 or the water supplying device 114A instead of the temperature detected by the temperature detector 117. Moreover, if the degree of the pressure decrease is preset as a function of time, the same effect can be expected by periodically operating the raw material supplying device 112 or the water supplying device 114A.

Embodiment 5

Next, Embodiment 5 of the present invention will be explained.

Figure 10:
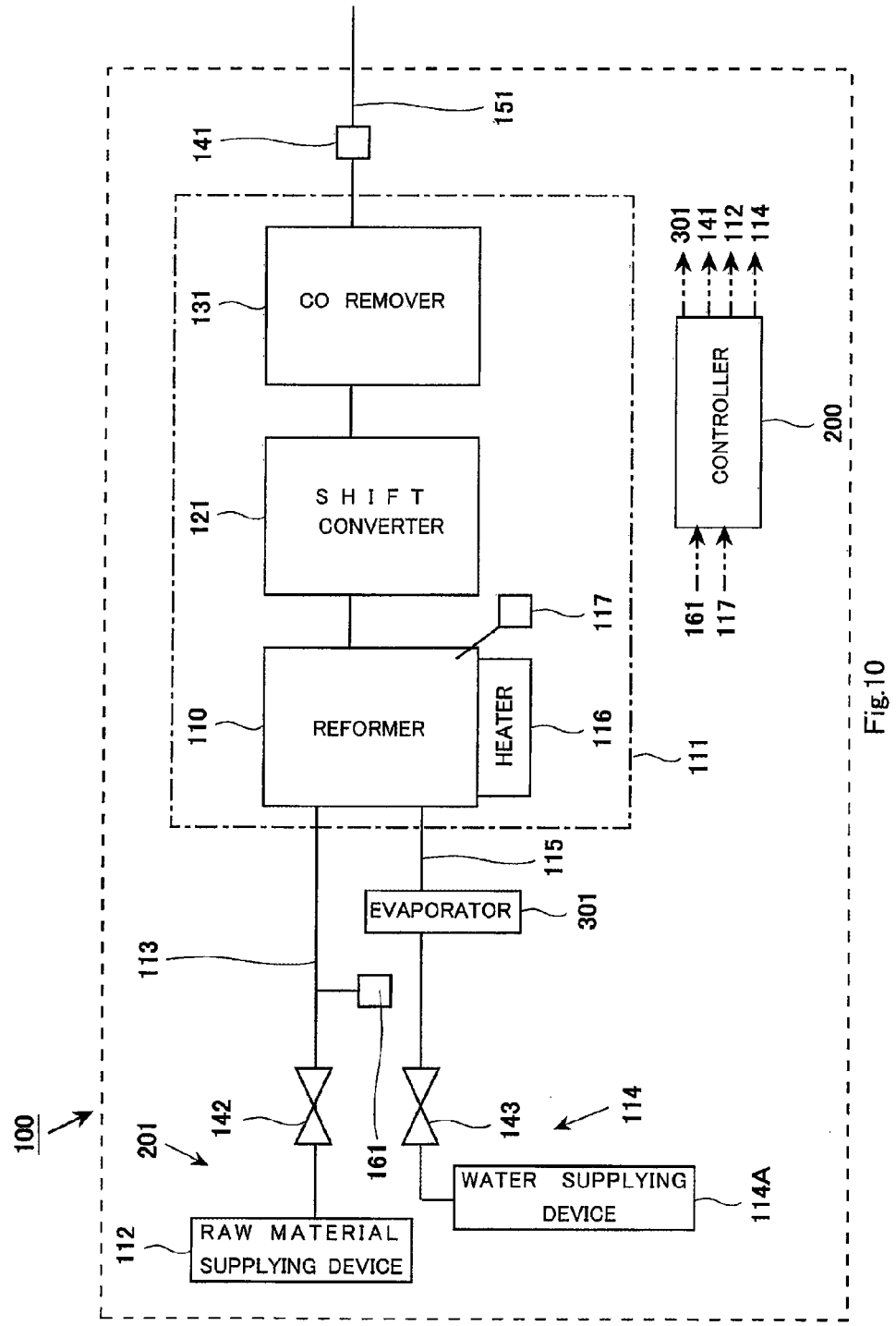
FIG. 10 is a schematic diagram showing a schematic configuration of the fuel processing apparatus according to Embodiment 5 of the present invention.

FIG. 10 is a schematic diagram showing a schematic configuration of the fuel processing apparatus 100 according to Embodiment 5 of the present invention. The fuel processing apparatus 100 according to Embodiment 5 of the present invention is substantially the same as that according to Embodiment 3. The following will explain a difference therebetween in reference to FIG. 10. The difference is that when supplying the steam to the reformer 110, the evaporator 301 is heated and the steam generated by the evaporator 301 is supplied to the reformer 110.

Operation of Fuel Processing Apparatus 100

Figure 11:
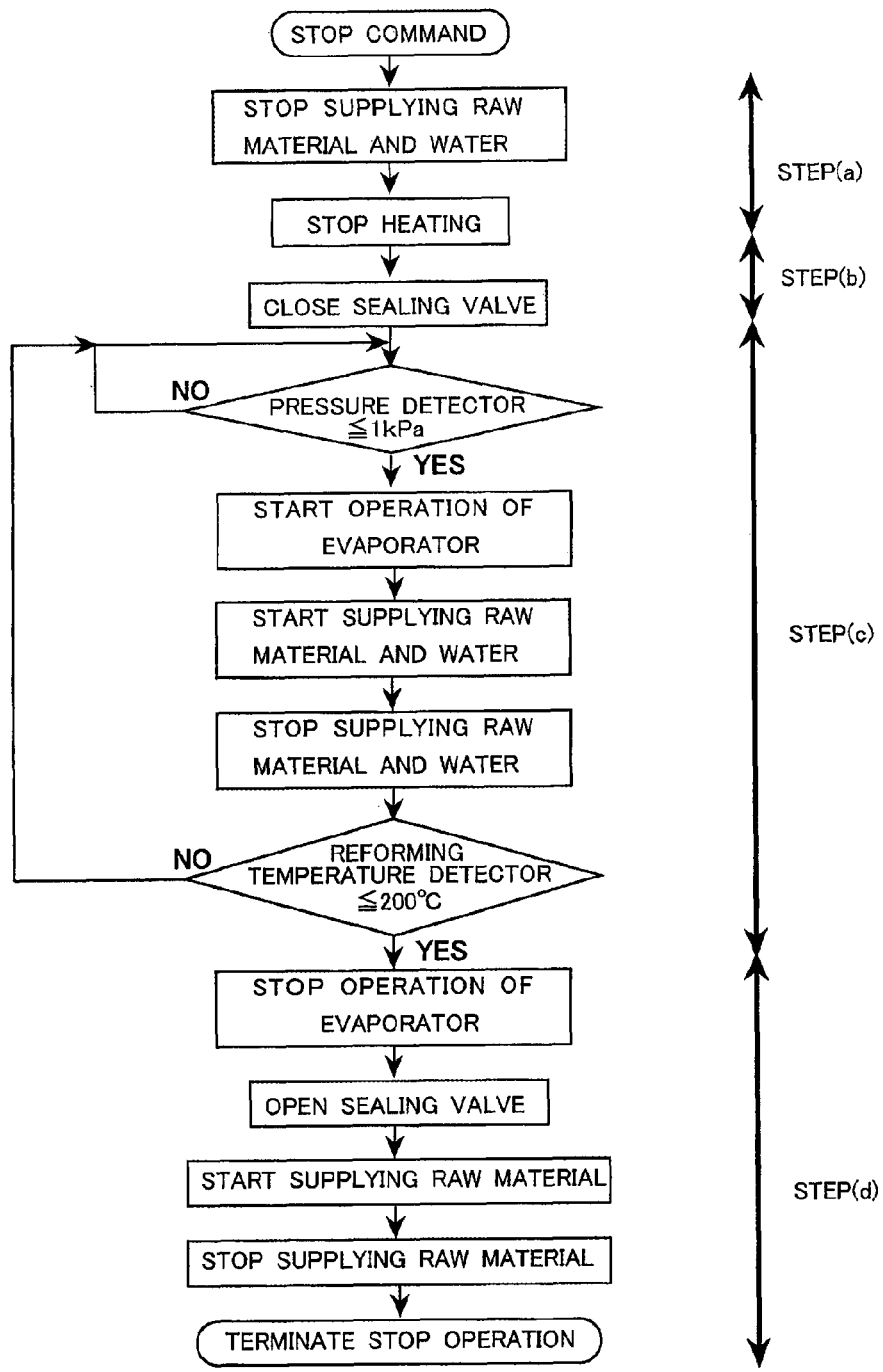
FIG. 11 is a flow chart showing the method for stopping the fuel processing apparatus according to Embodiment 5 of the present invention.

FIG. 11 is a flow chart showing the method for stopping the fuel processing apparatus according to Embodiment 5 of the present invention.

The stop operation of the fuel processing apparatus 100 of Embodiment 5 will be explained.

The stop operation of the fuel processing apparatus 100 of Embodiment 5 is substantially the same as that of Embodiment 3, so that only a difference therebetween will be explained. The difference is the stop operation in Step (a).

(a) Step of Stopping Raw Material Supplying Device 112 and Water Supplying Device 114A (Step of Blocking Supply of Raw Material and Steam to Reformer 110)

First, in order to stop the supply of the hydrogen from the fuel processing apparatus 100 to the outside in accordance with the stop command, the raw material supplying device 112 and the water supplying device 114A stop operating to stop the operation of generating the hydrogen-containing gas. At this time, the heater 116 stops heating. However, the operating of heating the evaporator 301 is executed in the pressure compensation operation.

In accordance with the above operation, when the pressure of the inside of the fuel processing apparatus 100 decreases, the water supplying device 114 operates simultaneously with the raw material supplying device 112, and the water is surely changed into the steam, so that the steam can be supplied to the reformer 110.

In a case where the water supplying device 114 supplies the water but the quantity of heat in the evaporator 301 for evaporation is not enough, the water may remain in the evaporator 301 or the reformer 110, and the passage may clog. However, since the fuel processing apparatus 100 of Embodiment 5 can supply the steam to the reformer 110, Embodiment 5 has an advantage of being able to suppress clogging of the passage.

A means for heating the evaporator 301 may be constituted by an electric heater, a burner, or the like. However, for example, the heater 116 may also serve as the means for heating the evaporator 301. In this case, the heater 116 heats the evaporator 301 in the pressure compensation operation and can be utilized as a heat source of the evaporator 301.

Embodiment 6

Figure 12:
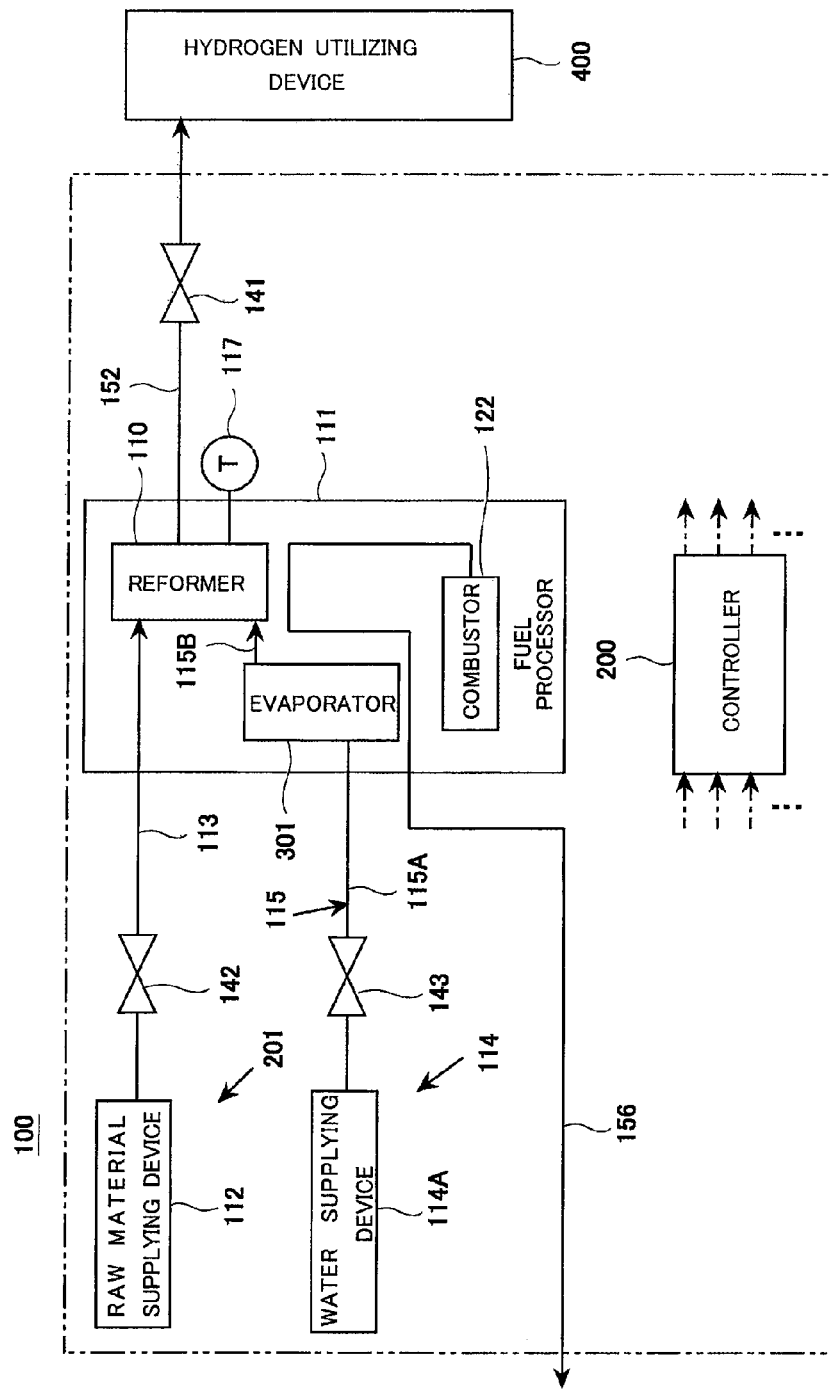
FIG. 12 is a schematic diagram showing a schematic configuration of the fuel processing apparatus according to Embodiment 6 of the present invention.
Figure 13:
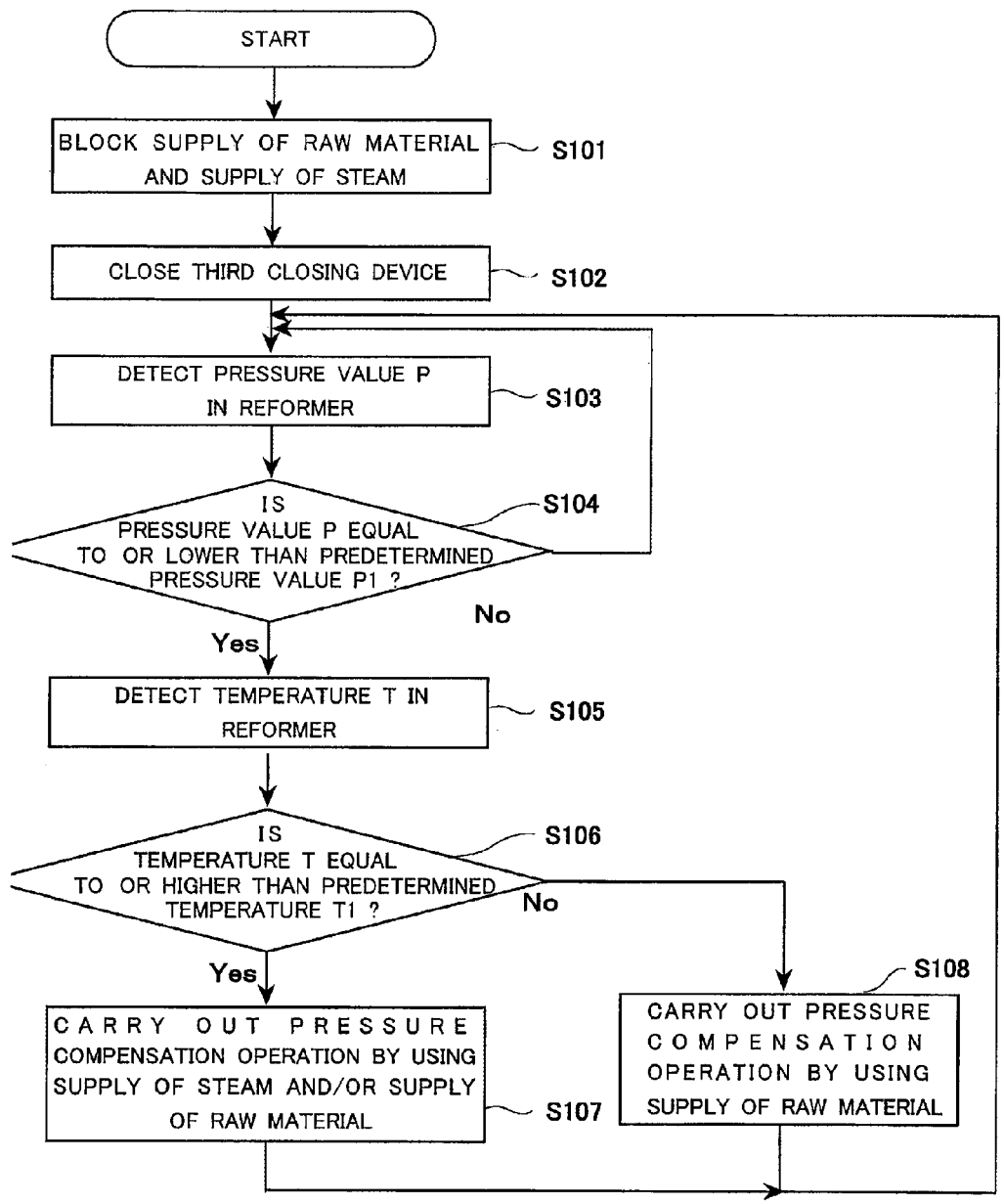
FIG. 13 is a flow chart schematically showing the pressure compensation operation carried out while the fuel processing apparatus shown in FIG. 12 stops.

FIG. 12 is a schematic diagram showing a schematic configuration of the fuel processing apparatus according to Embodiment 6 of the present invention. FIG. 13 is a flow chart schematically showing the pressure compensation operation carried out while the fuel processing apparatus shown in FIG. 12 stops.

As shown in FIG. 12, the fuel processing apparatus 100 according to Embodiment 6 of the present invention is the same in basic configuration as the fuel processing apparatus 100 according to Embodiment 2 but is different from the fuel processing apparatus 100 according to Embodiment 2 in that the temperature detector 117 configured to detect the internal temperature of the reformer 110 is provided. For example, the temperature detector 117 is constituted by a temperature sensor, such as a thermocouple or a thermistor, and outputs the detected temperature to the controller 200. In Embodiment 6, the internal temperature of the reformer 110 is directly detected by the temperature detector 117. However, the present embodiment is not limited to this. A detector configured to indirectly detect the internal temperature of the reformer 110 may be used. In this case, for example, an elapsed time since the sealing operation of the reformer 110 or since the execution of the pressure compensation operation may be detected, and the internal temperature of the reformer 110 may be determined based on this detected value.

Moreover, as shown in FIG. 13, the pressure compensation operation of the fuel processing apparatus 100 according to Embodiment 6 of the present invention is similar to the pressure compensation operation of the fuel processing apparatus 100 according to Embodiment 2. However, a difference therebetween is that the type of the gas supplied in the pressure compensation operation is changed depending on the reformer 110.

Specifically, when the operation of sealing the reformer 110 terminates (Step S102), and the pressure value P of the inside of the reformer 110 becomes equal to or lower than the predetermined pressure value P1, which indicates that the pressure compensation operation needs to be carried out, by the decrease of the internal pressure of the reformer 110, the decrease being caused by the temperature decrease (Yes in Step S104), the temperature detector 117 detects an internal temperature T of the reformer 110 and outputs the detected temperature T to the controller 200 (Step S105). The controller 200 determines whether or not the temperature T detected in Step S105 is equal to or higher than a predetermined temperature Ti (Step S106). Here, the predetermined temperature Ti is suitably set based on, for example, the type of the reforming catalyst such that the catalyst performance does not deteriorate (such that in a case where the pressure compensation is carried out by supplying the raw material to the reformer 110, the carbon in the raw material is not deposited on the surface of the reforming catalyst). For example, in a case where the nickel based catalyst is used as the reforming catalyst, and the temperature of the reforming catalyst is equal to or higher than 300° C., the carbon may be deposited on the surface of the catalyst by the flow of the raw material, and this may deteriorate the catalyst performance. Therefore, in a case where the nickel based catalyst is used as the reforming catalyst, it is preferable that the predetermined temperature Ti be 300° C.

Then, in a case where the temperature T is equal to or higher than the predetermined temperature Ti (Yes in Step S106), the controller 200 carries out the pressure compensation by using both the supply of the steam from the steam supplying unit 114 and the supply of the raw material from the raw material supplying unit 201 (Step S107). Specifically, the pressure compensation is carried out by executing at least one of the supply of the steam and the supply of the raw material to the reformer 110. In contrast, in a case where the temperature T is lower than the predetermined temperature Ti (No in Step S106), the pressure compensation is carried out by supplying the raw material from the raw material supplying unit 201 to the reformer 110 (Step S108).

As above, in the fuel processing apparatus 100 according to Embodiment 6, the pressure compensation by using the supply of the raw material is carried out at a temperature at which the carbon is not deposited on the reforming catalyst. Therefore, as compared to the fuel processing apparatuses 100 of Embodiments 1 and 2 each of which carries out the pressure compensation by using both the supply of the raw material and the supply of the steam regardless of the temperature of the reformer 110, it is possible to suppress water condensation on the reforming catalyst and water clogging in the evaporator 301 and the gas passage located downstream of the evaporator 301.

Embodiment 7

Figure 14:
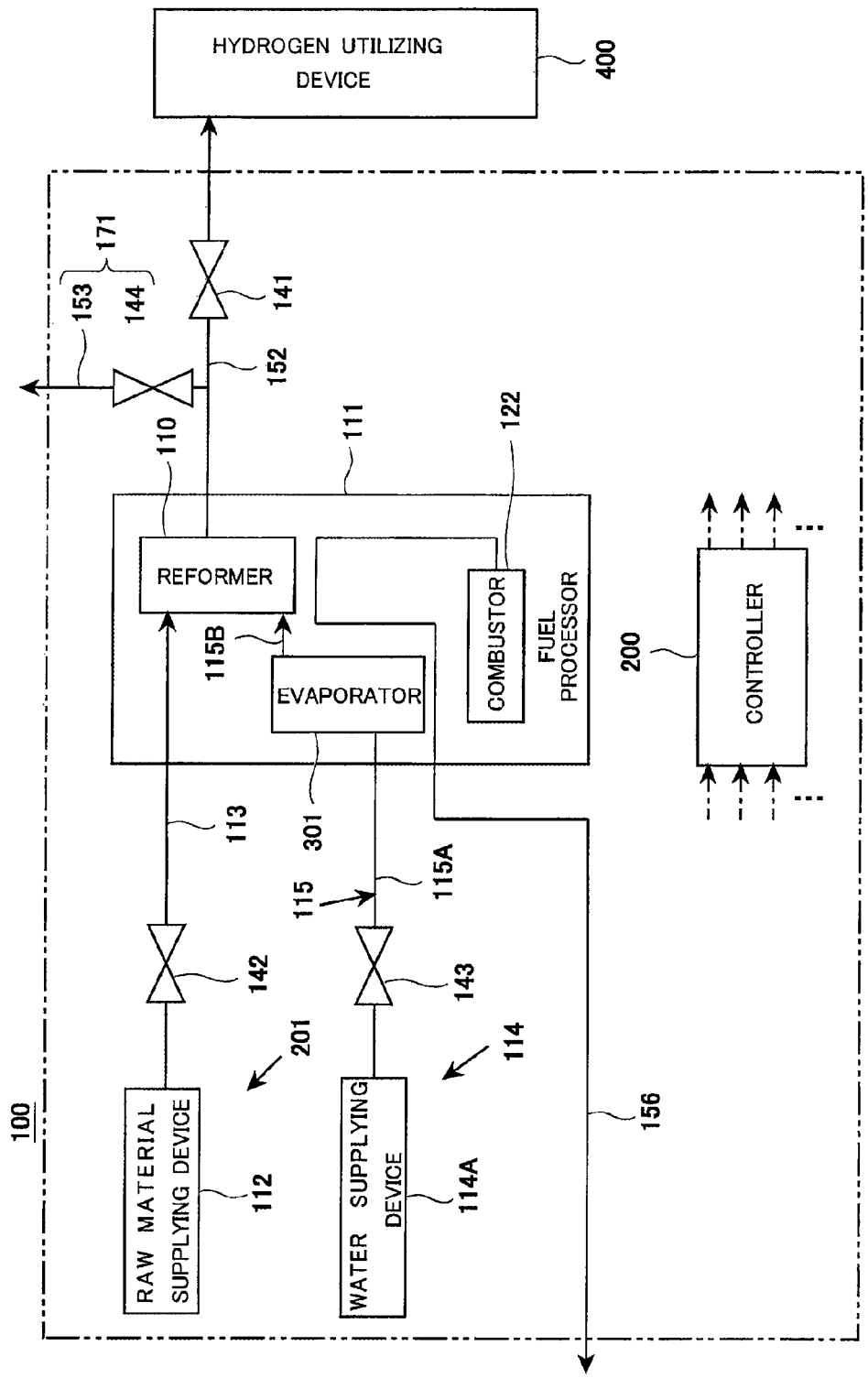
FIG. 14 is a schematic diagram showing a schematic configuration of the fuel processing apparatus according to Embodiment 7 of the present invention.
Figure 15:
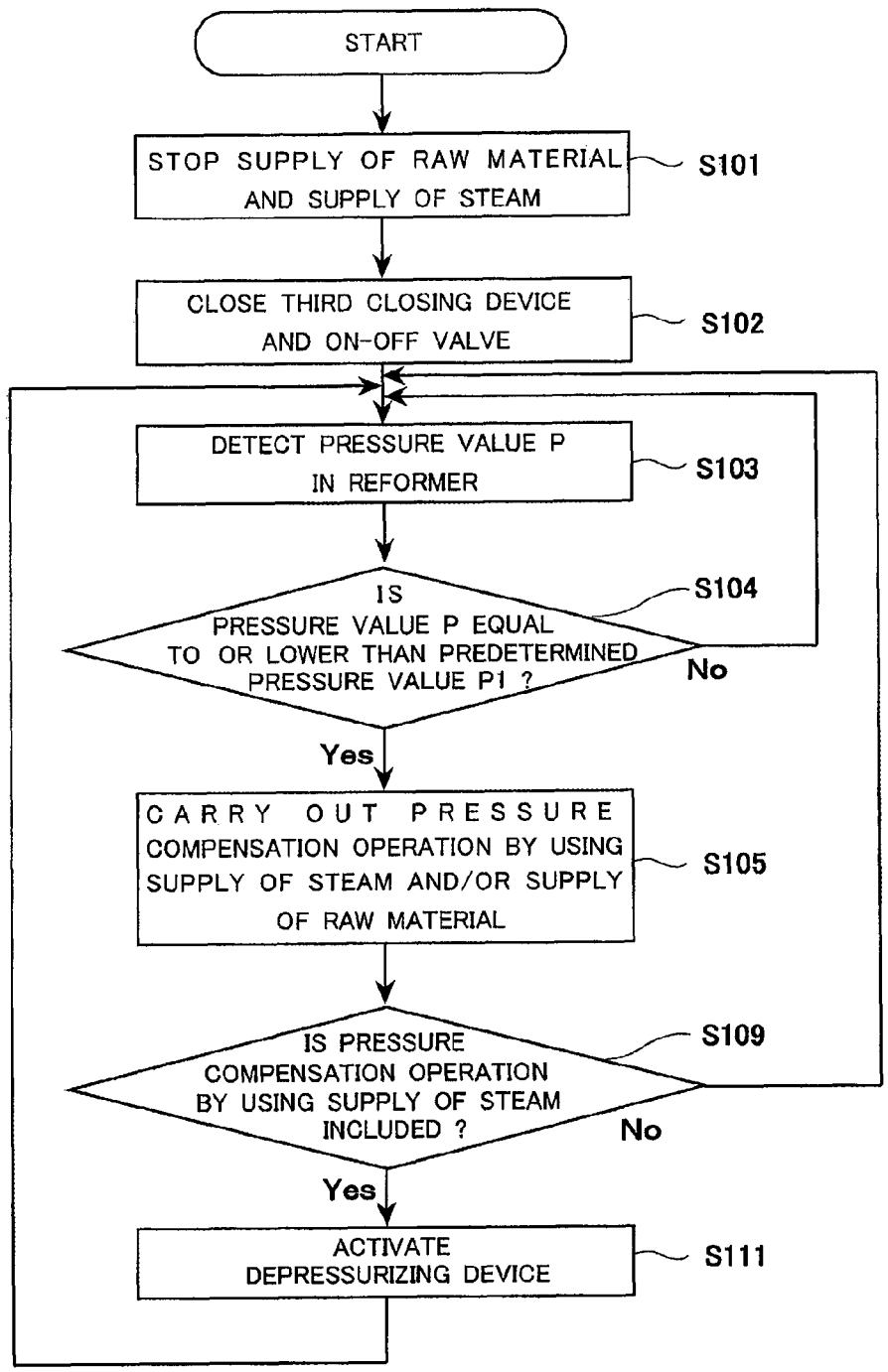
FIG. 15 is a flow chart schematically showing the pressure compensation operation carried out when the fuel processing apparatus shown in FIG. 14 stops.

FIG. 14 is a schematic diagram showing a schematic configuration of the fuel processing apparatus according to Embodiment 7 of the present invention. FIG. 15 is a flow chart schematically showing the pressure compensation operation carried out while the fuel processing apparatus shown in FIG. 14 stops.

As shown in FIG. 14, the fuel processing apparatus 100 according to Embodiment 7 of the present invention is the same in basic configuration as the fuel processing apparatus 100 according to Embodiment 2. However, a difference therebetween is that the fuel processing apparatus 100 according to Embodiment 7 includes a depressurizing device 171 configured to release a part of steam pressure, supplied to the reformer 110, to the atmosphere by releasing a part of the gas in the closed space including the reformer 110 to the atmosphere when the steam is supplied from the steam supplying unit 114 to the reformer 110.

Specifically, the depressurizing device 171 includes a depressurizing passage 153 and an on-off valve 144, and the on-off valve 144 is provided on the depressurizing passage 153. The depressurizing passage 153 has an upstream end connected to a portion of the gas passage 152 which portion is located upstream of the third closing device 141 and a downstream end which is open to the atmosphere. An on-off valve, such as a solenoid valve, can be used as the on-off valve 144.

Moreover, as shown in FIG. 15, the pressure compensation operation of the fuel processing apparatus 100 according to Embodiment 7 is similar to the pressure compensation operation of the fuel processing apparatus 100 according to Embodiment 1. However, a difference therebetween is that the on-off valve 144 is closed in Step S102. Moreover, when executing the supply of the steam (when executing the supply of the steam in the pressure compensation operation of the first mode, the second pressure compensation operation, or the like in Embodiment 1) (Yes in Step S109) in the pressure compensation operation of Step S105, the controller 200 activates the depressurizing device 171 (Step S110). Specifically, after the steam is supplied to the reformer 110, the controller 200 opens the on-off valve 144. Then, the controller 200 closes the on-off valve 144 to terminate a depressurizing operation, and returns to Step S103.

With this, even if higher pressure than the pressure decreased in the reformer 110 is supplied to the reformer 110 by the steam, the excessive pressure in the reformer 110 is released to the atmosphere. Therefore, as compared to a case where the excessive pressure due to the supply of the steam is not released to the atmosphere, pressure damage to the reformer 110 can be reduced.

In Embodiment 7, the depressurizing device 171 is configured such that the on-off valve 144 thereof opens by the controller 200. However, the present embodiment is not limited to this. The depressurizing device 171 may have any configuration as long as it can release a part of the steam (gas existing in the reformer 110), supplied to the reformer 110, to the atmosphere. For example, a valve, such as a relief valve or a solenoid valve including a spring sealing mechanism, including a mechanism configured to open by the pressure increase in the closed space including the reformer 110 may be used. Moreover, in Embodiment 7, the depressurizing device 171 is provided on the passage located downstream of the reformer 110. However, the present embodiment is not limited to this. The depressurizing device 171 may be provided on the passage located upstream of the reformer 110.

Modification Examples

Next, Modification Examples of the fuel processing apparatus 100 according to Embodiment 7 will be explained in reference to FIG. 16.

Figure 16:
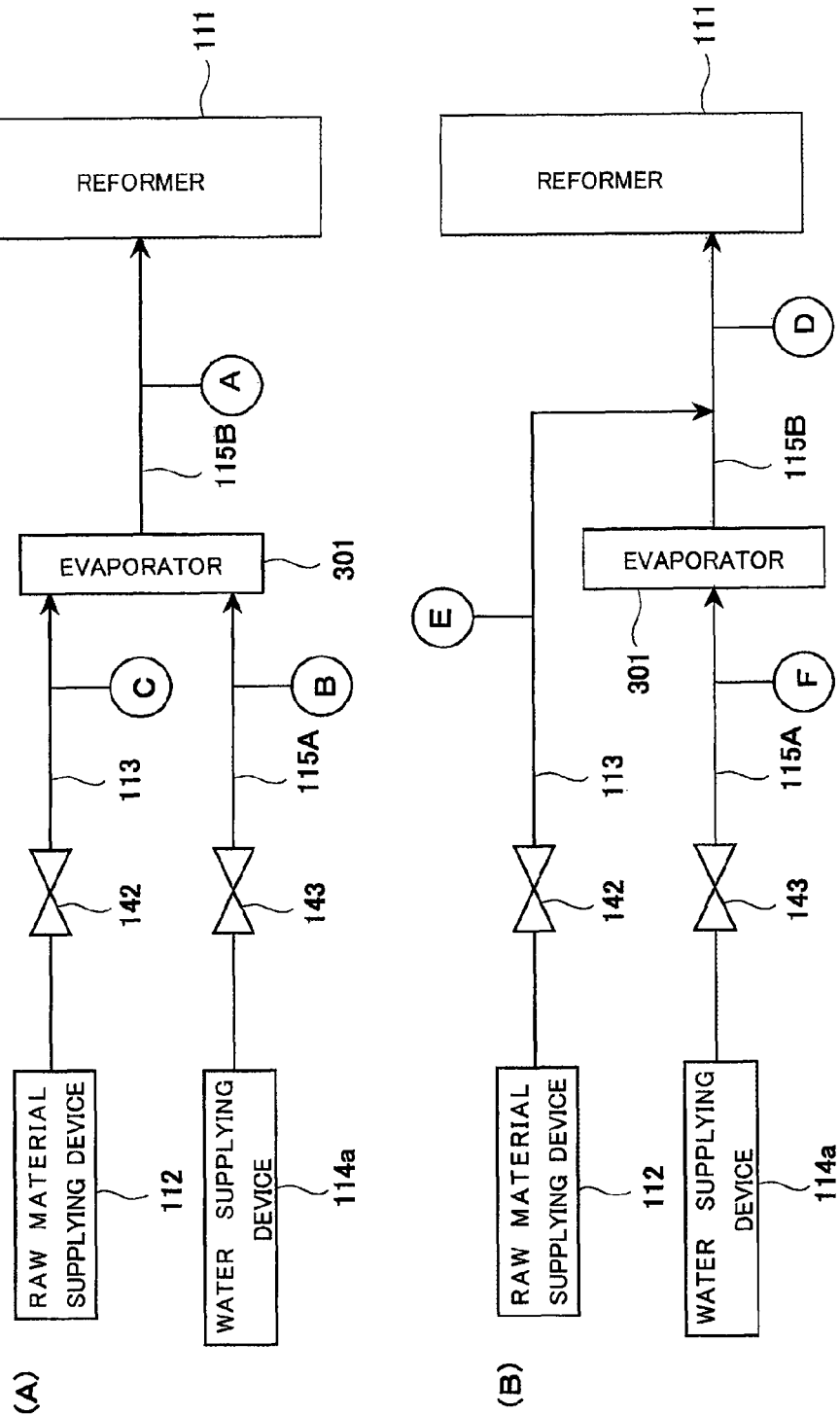
FIG. 16 is a schematic diagram showing a schematic configuration of the fuel processing apparatus of Modification Example.

FIG. 16 are schematic diagrams each showing a schematic configuration of the fuel processing apparatus of Modification Example. FIG. 16(A) shows the fuel processing apparatus of Modification Example 1, and FIG. 16(B) shows the fuel processing apparatus of Modification Example 2. In FIG. 16, a part of the fuel processing apparatus is omitted.

As shown in FIG. 16, the fuel processing apparatus 100 of each of Modification Examples 1 and 2 is the same in basic configuration as the fuel processing apparatus 100 according to Embodiment 7. However, a difference therebetween is that the depressurizing device 171 is provided upstream of the reformer 110. Moreover, the fuel processing apparatus 100 of Modification Example 1 is one example in which the raw material supplying device 112 and the water supplying device 114A are connected to the evaporator 301 in parallel. The fuel processing apparatus 100 of Modification Example 2 is one example in which the raw material supplying device 112 and the water supplying device 114A are connected to each other in series.

Specifically, as shown in FIG. 16(A), in the fuel processing apparatus 100 of Modification Example 1, the raw material supplying device 112 is connected to the evaporator 301 by the raw material supplying passage 113. In Modification Example 1, the depressurizing device 171 may be provided on the steam supplying passage 115B (position A shown in FIG. 16(A)), on the water supplying passage 115A (position B shown in FIG. 16(A)), or on the raw material supplying passage 113 (position C shown in FIG. 16(A)).

Moreover, as shown in FIG. 16(B), in the fuel processing apparatus 100 of Modification Example 2, the raw material supplying device 112 is connected to the steam supplying passage 115B through the raw material supplying passage 113. To be specific, a downstream end of the raw material supplying passage 113 is connected to a portion of the steam supplying passage 115B. In Modification Example 2, the depressurizing device 171 may be provided on the steam supplying passage 115B (position D shown in FIG. 16(B)), on the water supplying passage 115A (position E shown in FIG. 16(B)), or on the raw material supplying passage 113 (position F shown in FIG. 16(B)).

The fuel processing apparatus 100 of each of Modification Examples 1 and 2 configured as above has the same operational advantages as the fuel processing apparatus 100 according to Embodiment 7.

Embodiment 8

Figure 17:
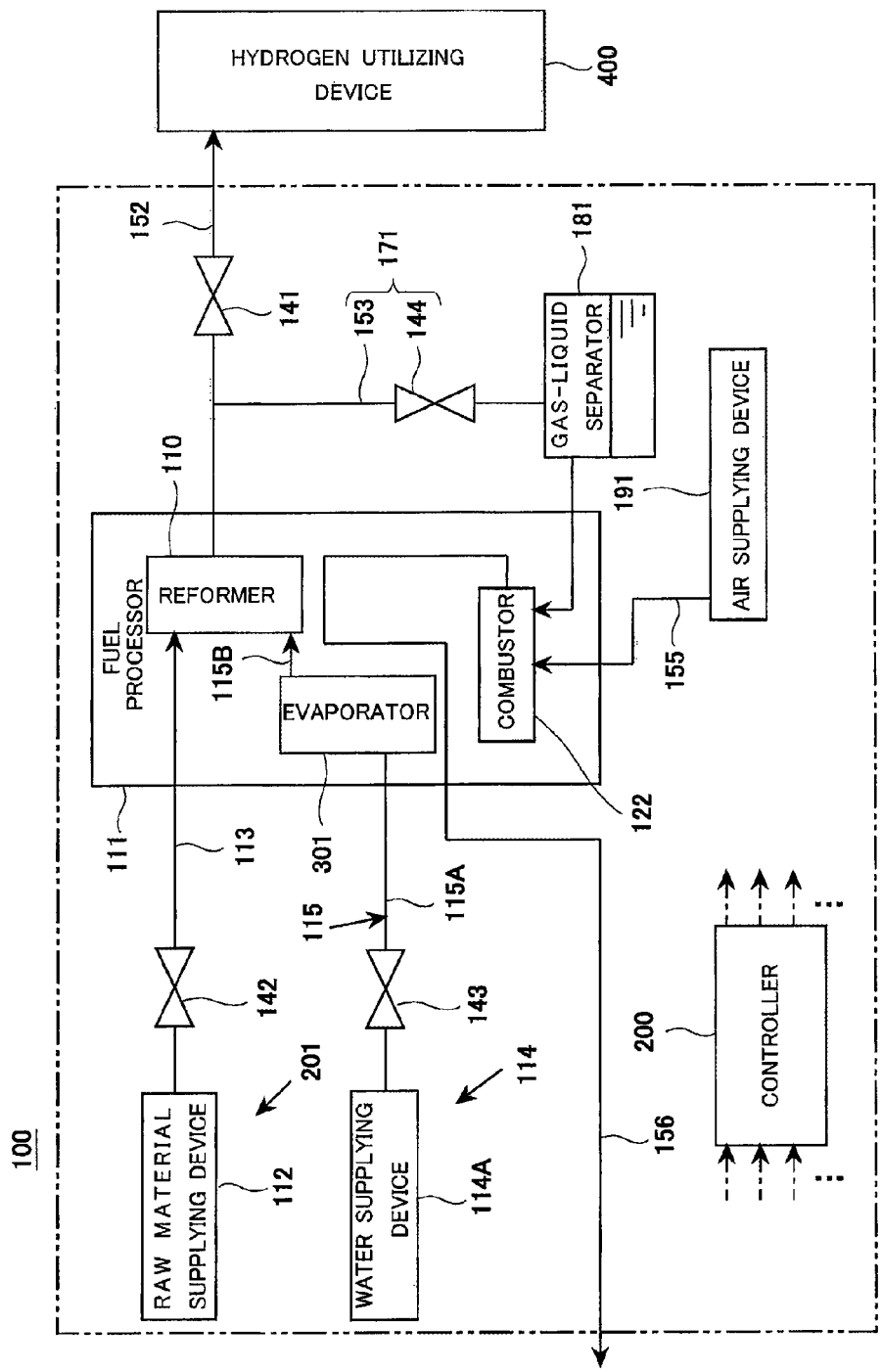
FIG. 17 is a schematic diagram showing a schematic configuration of the fuel processing apparatus according to Embodiment 8 of the present invention.
Figure 18:
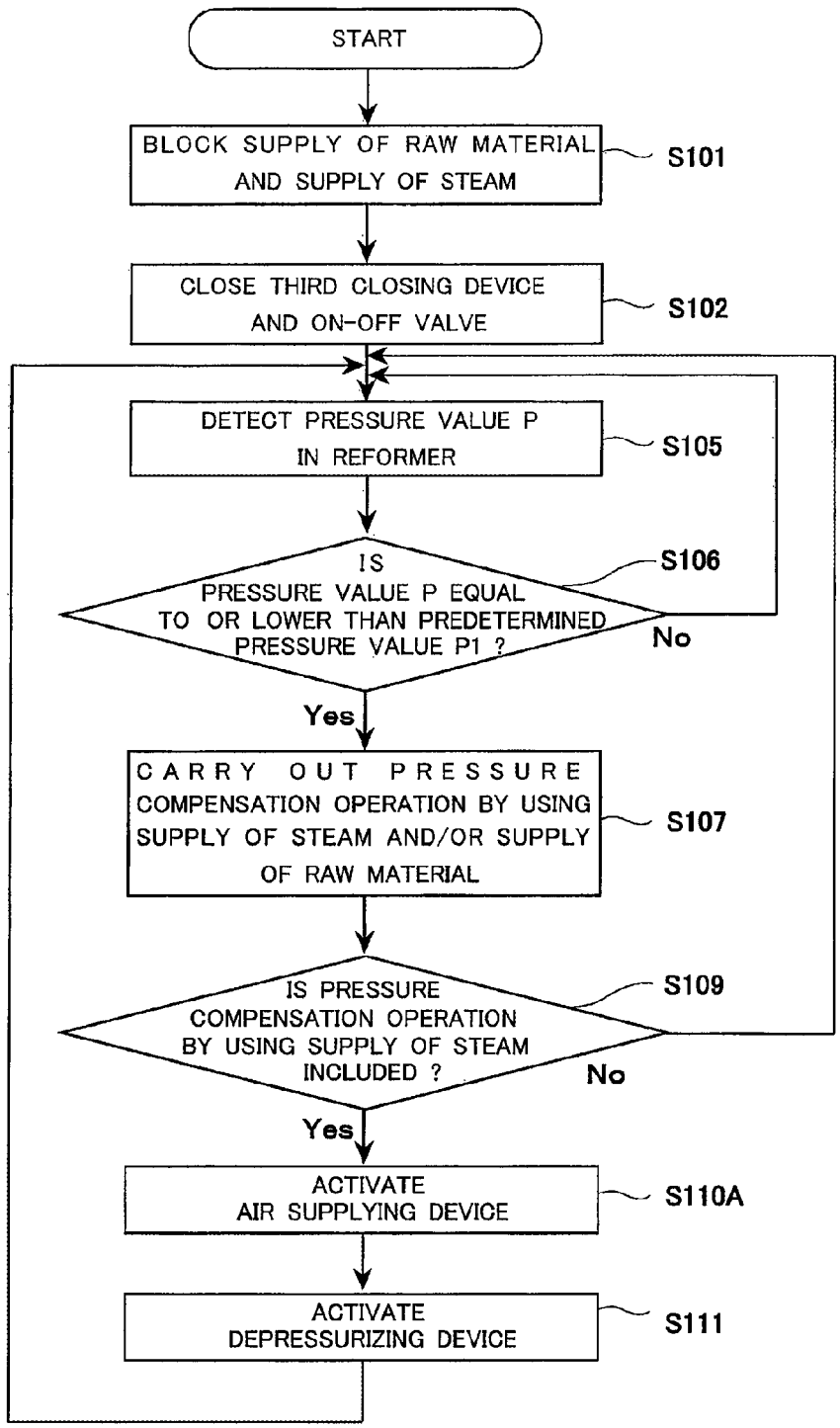
FIG. 18 is a flow chart schematically showing the pressure compensation operation carried out while the fuel processing apparatus shown in FIG. 17 stops.

FIG. 17 is a schematic diagram showing a schematic configuration of the fuel processing apparatus according to Embodiment 8 of the present invention. FIG. 18 is a flow chart schematically showing the pressure compensation operation carried out while the fuel processing apparatus shown in FIG. 17 stops.

As shown in FIG. 17, the fuel processing apparatus 100 according to Embodiment 8 of the present invention is the same in basic configuration as the fuel processing apparatus 100 according to Embodiment 7. However, a difference therebetween is that the fuel processing apparatus 100 according to Embodiment 8 includes an air supplying device 191 and the like.

Specifically, the fuel processing apparatus 100 according to Embodiment 8 includes the air supplying device 191 configured to supply combustion air to the combustor 122, and a gas-liquid separator 181. The fuel processing apparatus 100 according to Embodiment 8 is configured such that the gas discharged from the depressurizing device 171 flows through the depressurizing passage 153 that is a discharging passage to the combustor 122. More specifically, the gas-liquid separator 181 is connected to a portion of the depressurizing passage 153 of the depressurizing device 171 which portion is located downstream of the on-off valve 144, and the gas-liquid separator 181 is connected to the combustor 122 through the depressurizing passage 153. The gas-liquid separator 181 is configured to separate the water from the gas flowing through the depressurizing passage 153 by condensing the steam of the gas into the water. The separated water is stored in a tank of the gas-liquid separator 181. With this, the steam is prevented from getting into the combustor 122, so that the fire of the combustor 122 can be prevented from being extinguished, and a combustion efficiency of the combustor 122 can be prevented from deteriorating.

Moreover, the air supplying device 191 is connected to the combustor 122 through a combustion air supplying passage 155. The air supplying device 191 supplies the combustion air to the combustor 122. For example, a fan, such as a blower or a sirocco fan, can be used as the air supplying device 191. With this, in the combustor 122, the gas containing the combustible gas, such as the hydrogen gas and the raw material, discharged from the reformer 110 through the depressurizing passage 153 is diluted by the air supplied from the air supplying device 191. Then, the gas is discharged through the flue gas passage 156 and an exhaust port (not shown) to the outside of the fuel processing apparatus 100.

Then, as shown in FIG. 18, the pressure compensation operation of the fuel processing apparatus 100 according to Embodiment 8 is similar to the pressure compensation operation of the fuel processing apparatus 100 according to Embodiment 7. However, a difference therebetween is that the air supplying device 191 is activated when activating the depressurizing device 171. Specifically, when executing the supply of the steam (when executing the supply of the steam in the pressure compensation operation of the first mode, the second pressure compensation operation, or the like in Embodiment 1) (Yes in Step S109) in the pressure compensation operation in Step S107, the controller 200 activates the air supplying device 191 (Step S110A) and the depressurizing device 171 (Step S110). Then, the controller 200 closes the on-off valve 144, stops the air supplying device 191, terminates the depressurizing operation, and returns to Step S105.

With this, when supplying the steam by the steam supplying unit 114, the combustible gas, such as the hydrogen gas, contained in the gas discharged from the depressurizing device 171 is diluted and discharged by the air supplied from the air supplying device 191. Therefore, the safety further improves as compared to a case where the gas discharged during the depressurizing is not diluted and discharged. In the above flow, the air supplying device 191 is activated before the depressurizing device 171 is activated to open to the atmosphere. This is preferable since the gas discharged from the depressurizing device 171 is more surely diluted and discharged. Moreover, in the above flow, the controller 200 opens the on-off valve 144. However, as with Embodiment 7, instead of the on-off valve 144, a valve, such as a relief valve or a solenoid valve including a spring sealing mechanism, including a mechanism configured to open by the pressure increase in the closed space including the reformer 110 may be used. In this case, the gas may be discharged from the depressurizing device 171 immediately after the start of the supply of the steam. Therefore, it is preferable that: Step S109 be executed before Step S107; when executing the supply of the steam (Yes in Step S109) in the pressure compensation operation, the air supplying device 191 be activated together with the pressure compensation operation of Step S107.

In Embodiment 8, the gas-liquid separator 181 is provided on the depressurizing passage 153 located upstream of the combustor 122. However, the present embodiment is not limited to this. The gas-liquid separator 181 may not be provided. Moreover, in Embodiment 8, the air supplying device 191 is activated when executing the supply of the steam in the pressure compensation operation. However, the present embodiment is not limited to this. The air supplying device 191 may be activated when executing the supply of the raw material in the pressure compensation operation.

Modification Example

Next, Modification Example of the fuel processing apparatus 100 according to Embodiment 8 will be explained in reference to FIG. 19.

Figure 19:
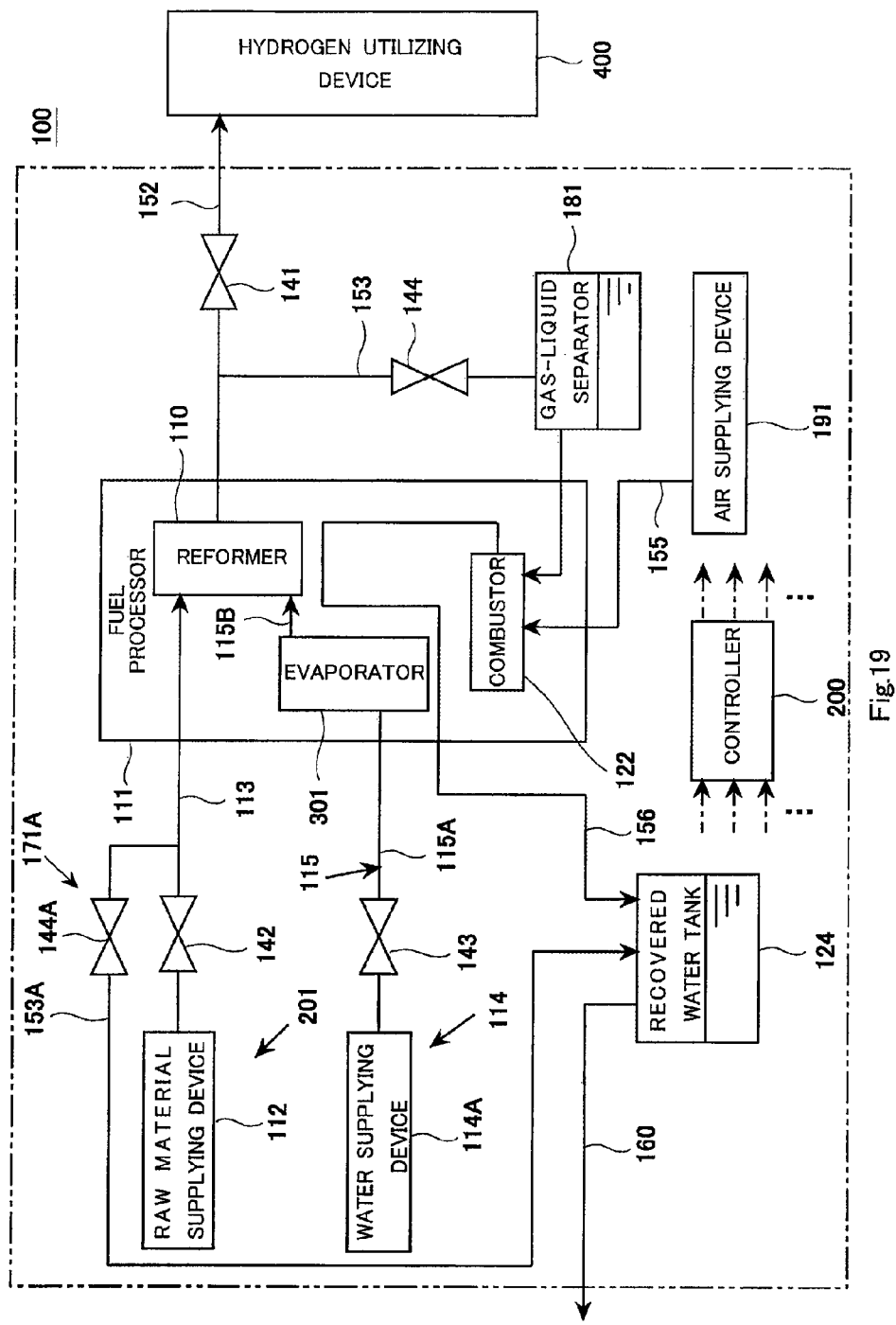
FIG. 19 is a schematic diagram showing a schematic configuration of the fuel processing apparatus of Modification Example 3.

FIG. 19 is a schematic diagram showing a schematic configuration of the fuel processing apparatus of Modification Example 3.

As shown in FIG. 19, the fuel processing apparatus 100 of Modification Example 3 is one example in which a depressurizing device 171A is provided on a passage (herein, the raw material supplying passage 113) located upstream of the reformer 110. A specific explanation is as follows.

In the fuel processing apparatus 100 of Modification Example 3, a depressurizing passage 153A branching from the raw material supplying passage 113 is provided between the first closing device 142 and the reformer 110 on the raw material supplying passage 113.

The depressurizing passage 153A has a downstream end connected to a recovered water tank 124. Moreover, an on-off valve 144A configured to allow or block the flow of the gas (such as the steam, the raw material, and the like) in the depressurizing passage 153A is provided on a portion of the depressurizing passage 153A.

The recovered water tank 124 is connected to the combustor 122 through the flue gas passage 156 and is configured to recover the water contained in the flue gas generated in the combustor 122. Specifically, the recovered water tank 124 is configured to store the water condensed while the flue gas flows through the flue gas passage 156. Moreover, the recovered water tank 124 is open to the atmosphere through an atmosphere communication passage 160. With this, the flue gas having flowed through the flue gas passage 156 to the recovered water tank 124 flows through the atmosphere communication passage 160 to be discharged to the outside of the fuel processing apparatus 100. A condenser or the like may be provided on a portion of the flue gas passage 156, and the recovered water tank 124 may store the water condensed by the condenser.

Unlike the fuel processing apparatus 100 according to Embodiment 8, the fuel processing apparatus 100 of Modification Example 3 is configured to cause the depressurizing device 171A to carry out the depressurizing when executing the supply of the steam by the steam supplying unit 114 in the pressure compensation operation. Regarding the operation of the depressurizing device 171A, the controller 200 opens the on-off valve 144A. However, the present modification example is not limited to the above case where the controller 200 opens the on-off valve 144A. As with Embodiment 8, instead of the on-off valve 144A, a valve, such as a relief valve or a solenoid valve including a spring sealing mechanism, including a mechanism configured to open by the pressure increase in the closed space including the reformer 110 may be used.

With this, when executing the supply of the steam by the steam supplying unit 114 in the pressure compensation operation, the combustible gas, such as the raw material, contained in the gas discharged from the depressurizing device 171A is supplied to the recovered water tank 124. Meanwhile, the air from the air supplying device 191 is supplied through the combustion air supplying passage 155, the combustor 122, and the flue gas passage 156 to the recovered water tank 124. Therefore, the combustible gas, such as the raw material, supplied to the recovered water tank 124 is diluted by the air and discharged through the atmosphere communication passage 160 to the atmosphere. On this account, the safety further improves as compared to a case where the gas discharged during the depressurizing is not diluted and discharged. In order to more surely dilute and discharge the gas discharged from the depressurizing device 171, it is preferable that the air supplying device 191 be activated before the depressurizing device 171A is activated to open to the atmosphere.

Embodiment 9

Figure 20:
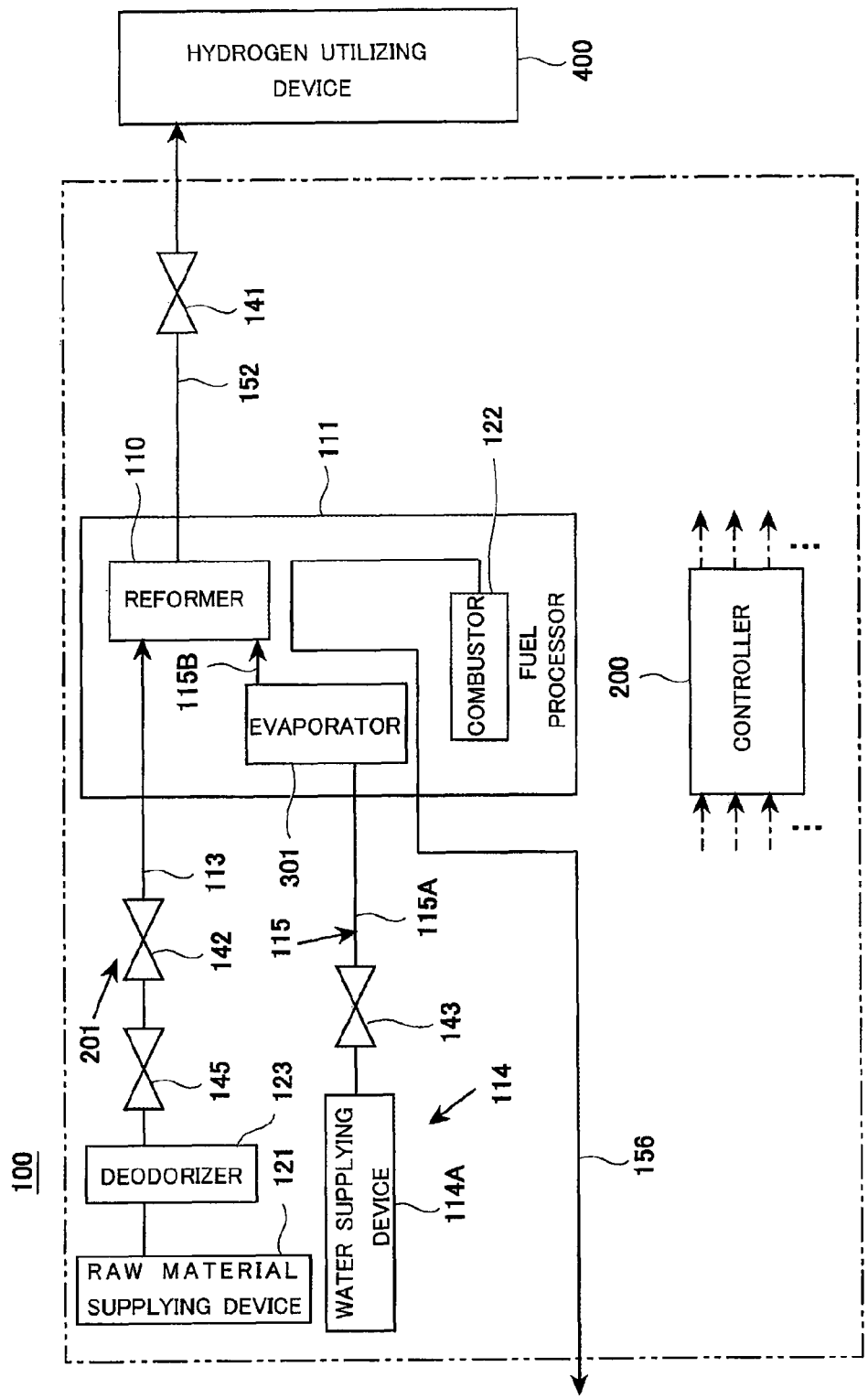
FIG. 20 is a schematic diagram showing a schematic configuration of the fuel processing apparatus according to Embodiment 9 of the present invention.

FIG. 20 is a schematic diagram showing a schematic configuration of the fuel processing apparatus according to Embodiment 9 of the present invention.

As shown in FIG. 20, the fuel processing apparatus 100 according to Embodiment 9 of the present invention is the same in basic configuration as the fuel processing apparatus 100 according to Embodiment 2. A difference therebetween is that a deodorizer 123 and a check valve 145 are provided on the raw material supplying passage 113. Specifically, the fuel processing apparatus 100 according to Embodiment 9 is configured such that: the deodorizer 123 is provided upstream of the first closing device 142 on the raw material supplying passage 113; and the check valve 145 is provided between the deodorizer 123 and the first closing device 142 to block the flow of the gas from the reformer 110 to the deodorizer 123.

The deodorizer 123 is configured to remove an odorous component (such as mercaptan) contained in the raw material. For example, the deodorizer 123 may include an activated carbon or a filter. By generating the steam in the evaporator 301 when executing the supply of the raw material by the raw material supplying unit 201 in the pressure compensation operation, the steam may flow back to the deodorizer 123 by excessive steam pressure. However, this can be prevented by providing the check valve 145. Especially, when executing the pressure compensation operation of the first mode described in Embodiment 1, the supply of the steam from the steam supplying unit 114 is also executed, so that the steam may flow back to the deodorizer 123 when supplying the raw material. However, this can be prevented by the check valve 145.

The fuel processing apparatus 100 according to Embodiment 9 configured as above has the same operational advantages as the fuel processing apparatus 100 according to Embodiment 2.

In Embodiment 9, the deodorizer 123 is provided between the raw material supplying device 112 and the first closing device 142. However, the deodorizer 123 may be provided anywhere as long as it is provided upstream of the first closing device 142 on the raw material supplying passage 113. For example, the deodorizer 123 may be provided upstream of the raw material supplying device 112. Moreover, in Embodiment 9, the check valve 145 is provided upstream of the first closing device 142. However, the check valve 145 may be provided at any position as long as it is provided downstream of the deodorizer 123. Therefore, the check valve 145 may be provided downstream of the first closing device 142.

Modification Example

Next, Modification Example of the fuel processing apparatus 100 according to Embodiment 9 will be explained in reference to FIG. 21.

Figure 21:
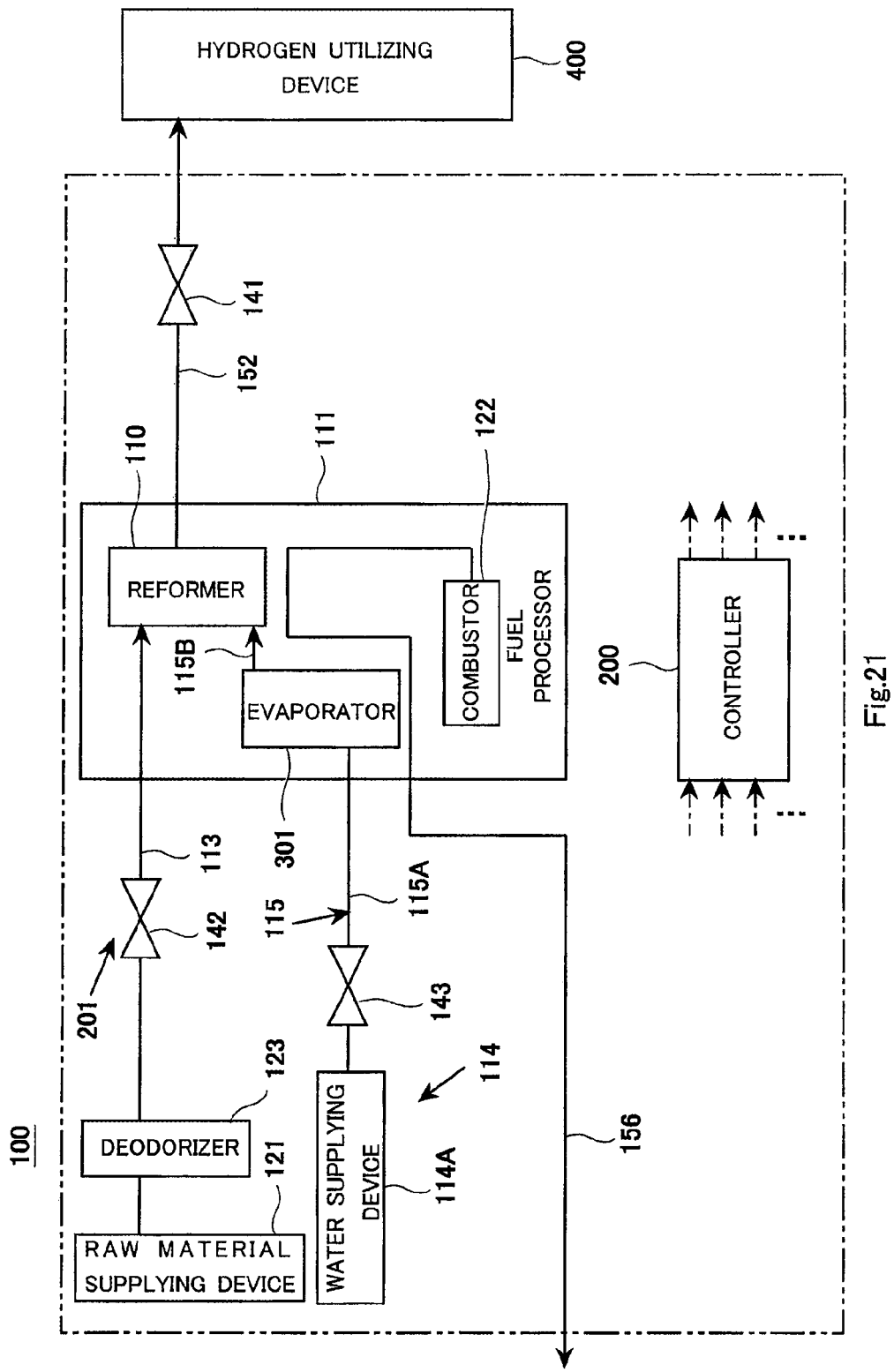
FIG. 21 is a schematic diagram showing a schematic configuration of the fuel processing apparatus of Modification Example 4.

FIG. 21 is a schematic diagram showing a schematic configuration of the fuel processing apparatus of Modification Example 4.

As shown in FIG. 21, the fuel processing apparatus 100 of Modification Example 4 is one example in which the check valve 145 is not provided, and the first closing device 142 is constituted by a solenoid valve. The first closing device 142 is configured such that in a case where the internal pressure of the reformer 101 increases and the gas pressure existing downstream of the first closing device 142 becomes higher than the gas pressure existing upstream thereof when the controller 200 opens a valve body of the solenoid valve that is the first closing device 142, the valve body of the solenoid valve moves by the gas pressure existing downstream of the first closing device 142 to contact a valve seat and block the raw material supplying passage 113. By generating the steam in the evaporator 301 when executing the supply of the raw material by the raw material supplying unit 201 in the pressure compensation operation, the steam may flow back to the deodorizer 123 by the excessive steam pressure. However, this can be prevented as with the fuel processing apparatus 100 of Embodiment 9.

Embodiment 10

Figure 22:
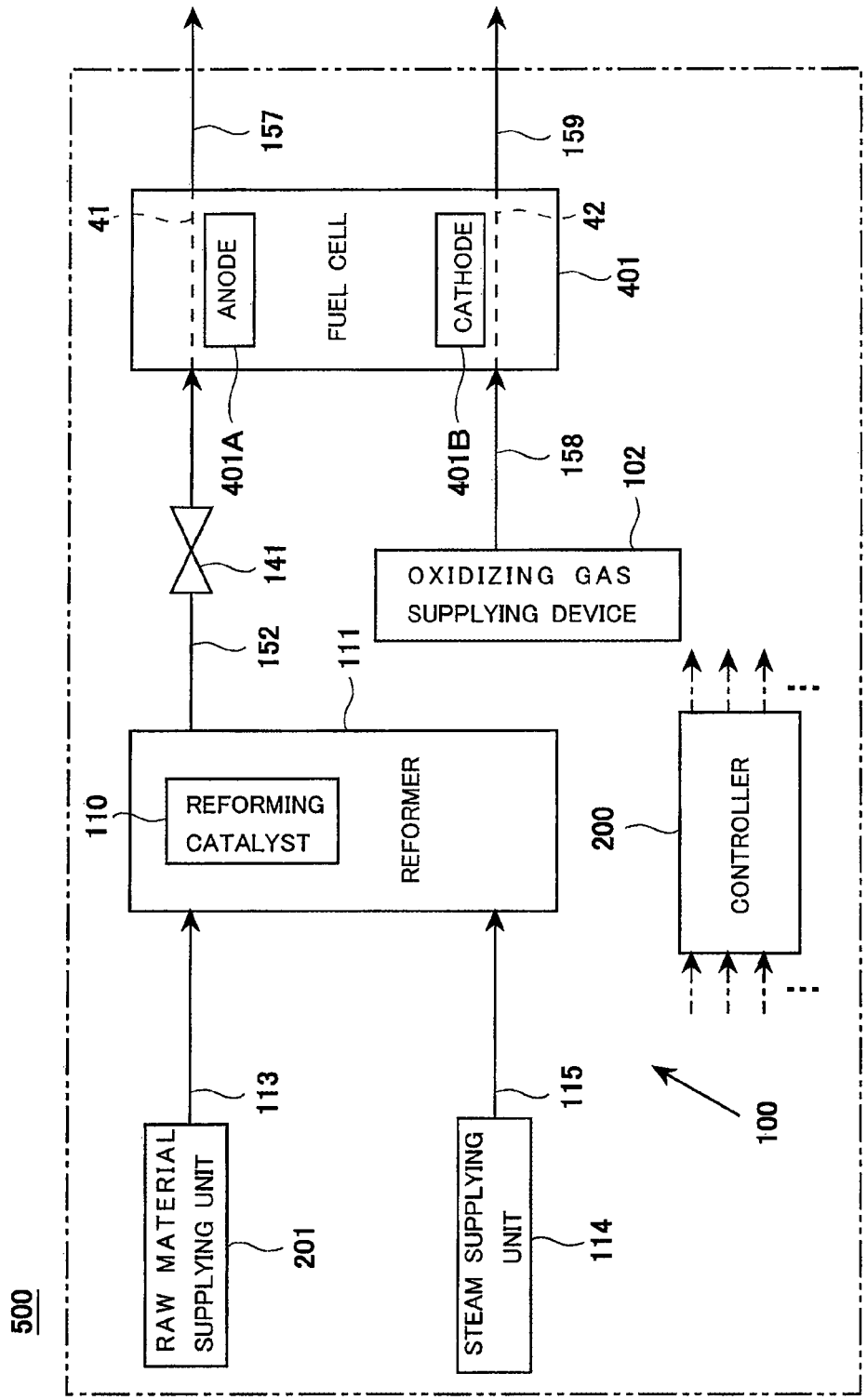
FIG. 22 is a schematic diagram showing a schematic configuration of the fuel cell system according to Embodiment 10 of the present invention.

FIG. 22 is a schematic diagram showing a schematic configuration of the fuel cell system according to Embodiment 10 of the present invention.

As shown in FIG. 22, a fuel cell system 500 according to Embodiment 10 of the present invention includes the fuel processing apparatus 100 according to Embodiment 1 and a fuel cell 401 configured to generate electric power using the hydrogen-containing gas supplied from the fuel processing apparatus 100.

The fuel cell 401 includes an anode 401A and a cathode 401B. Moreover, the fuel cell 401 is provided with a fuel gas passage 41 through which the fuel gas (hydrogen-containing gas) is supplied to the anode 401A and an oxidizing gas passage 42 through which the oxidizing gas (herein, the air) is supplied to the cathode 401B.

The fuel gas passage 41 of the fuel cell 101 has an upstream end connected through a hydrogen-containing gas supplying passage 152 to the reformer 110 and a downstream end connected to an off fuel gas passage 157. Moreover, the oxidizing gas passage 42 has an upstream end connected through an oxidizing gas supplying passage 158 to an oxidizing gas supplying device 102 and a downstream end connected to an off oxidizing gas passage 159.

The fuel cell 401 causes the hydrogen-containing gas supplied to the anode 401A and the air supplied to the cathode 401B to electrochemically react with each other to generate electricity and heat. Then, the surplus hydrogen-containing gas unconsumed in the anode 401A and the surplus oxidizing gas unconsumed in the cathode 401B are discharged to the outside of the fuel cell system 500 (to the atmosphere). It is preferable that the surplus hydrogen-containing gas unconsumed in the anode 401A be discharged to the atmosphere after it is combusted by an off fuel gas processor, not shown, or it is diluted by the air. Moreover, in a case where the fuel processing apparatus 100 includes the combustor 122, the hydrogen-containing gas unconsumed in the anode 401A may be used as the combustion fuel of the combustor 122.

In Embodiment 10, the controller 200 is configured to control not only the fuel processing apparatus 100 but also the other devices constituting the fuel cell system 500. Then, the controller 200 is configured to carry out the pressure compensation operation of the fuel processing apparatus 100 as described in Embodiment 1 while the fuel cell system 500 stops.

Therefore, the fuel cell system 500 according to Embodiment 10 has the same operational advantages as the fuel processing apparatus 100 according to Embodiment 1.

The fuel cell system 500 according to Embodiment 10 includes the fuel processing apparatus 100 according to Embodiment 1. However, the present embodiment is not limited to this. The fuel cell system 500 according to Embodiment 10 may include the fuel processing apparatus 100 according to any one of Embodiments 2 to 9 and Modification Examples 1 to 4.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. Moreover, various inventions can be made by suitable combinations of a plurality of components disclosed in the above embodiments.

INDUSTRIAL APPLICABILITY

The fuel processing apparatus, fuel cell system including the fuel processing apparatus, and method for operating the fuel processing apparatus of the present invention are useful in a fuel cell field since the carbon deposition on the reforming catalyst by the thermal decomposition of the raw material or the like can be suppressed than before in the pressure compensation operation carried out while the apparatus stops.

REFERENCE SIGNS LIST

| | |
|---|---|
| 41 | hydrogen-containing gas passage |
| 42 | oxidizing gas passage |
| 100 | fuel processing apparatus |
| 101 | fuel processing apparatus |
| 102 | oxidizing gas supplying device |
| 110 | reformer |
| 111 | fuel processor |
| 112 | raw material supplying device |
| 113 | raw material supplying passage |
| 114 | steam supplying unit |
| 114A | water supplying device |
| 115 | water supplying passage (steam supplying passage) |
| 115A | water supplying passage |
| 115B | steam supplying passage |
| 116 | heater |
| 117 | temperature detector |
| 118 | water supplying passage |
| 121 | shift converter |
| 122 | combustor |
| 123 | deodorizer |
| 131 | CO remover |
| 141 | sealing valve (third closing device) |
| 142 | first closing device |
| 143 | second closing device |
| 144 | on-off valve |
| 145 | check valve |
| 151 | supplying pipe |
| 152 | gas passage |
| 153 | depressurizing passage |
| 154 | discharging passage |
| 155 | combustion air supplying passage |
| 156 | flue gas passage |
| 157 | anode off gas passage |
| 158 | cathode air supplying passage |
| 159 | cathode off gas passage |
| 161 | pressure detector |
| 171 | depressurizing device |
| 181 | gas-liquid separator |
| 191 | air supplying device |
| 200 | controller |
| 201 | raw material supplying unit |
| 301 | evaporator |
| 400 | hydrogen utilizing device |
| 401 | fuel cell |
| 401A | anode |
| 401B | cathode |
| 500 | fuel cell system |

The invention claimed is:

1. A method for operating a fuel processing apparatus, the method comprising steps of:
   (a) sealing a reformer by blocking supply of a raw material from a raw material supplying unit to the reformer and supply of steam from a steam supplying unit to the reformer and closing a closing device, the reformer including a reforming catalyst and being configured to cause a reforming reaction between the raw material and the steam to generate a hydrogen-containing gas, the raw material supplying unit being configured to supply the raw material through a raw material supplying passage to the reformer and block the supply of the raw material, the steam supplying unit being configured to supply the steam through a steam supplying passage to the reformer and block the supply of the steam, and the closing device being configured to block a gas passage located downstream of the reformer; and
   (b) in a state where the reformer is blocked from outside air by closing the closing device, carrying out a pressure compensation operation by using both the supply of the steam from the steam supplying unit and the supply of the raw material from the raw material supplying unit when a pressure of the sealed reformer decreases due to a temperature decrease of the reformer after step (a).

2. The method according to claim 1, wherein in step (b), both the supply of the steam from the steam supplying unit and the supply of the raw material from the raw material supplying unit are executed.

3. The method according to claim 2, wherein:
   the pressure compensation operation of the step (b) includes a first pressure compensation operation and a second pressure compensation operation,
   the first pressure compensation operation is carried out by using both the supply of the steam from the steam supplying unit and the supply of the raw material from the raw material supplying unit, and
   the second pressure compensation operation is carried out by using either one of only the supply of the steam from the steam supplying unit or only the supply of the raw material from the raw material supplying unit.

4. The method according to claim 3, wherein:
   the pressure compensation operation of the step (b) further includes a third pressure compensation operation which is carried out by using another one of only the supply of the steam from the steam supplying unit or only the supply of the raw material from the raw material supplying unit.

5. The method according to claim 1, wherein:
   the pressure compensation operation of the step (b) includes a first pressure compensation operation and a second pressure compensation operation,
   the first pressure compensation operation is carried out by using only the supply of the steam from the steam supplying unit, and the second pressure compensation operation is carried out by using only the supply of the raw material from the raw material supplying unit.

6. The method according to claim 1, wherein:
in step (b), at least a temperature at which deposition of carbon of the raw material occurs on the reforming catalyst, the pressure compensation operation by using both the supply of the raw material from the raw material supplying unit and the supply of the steam from the steam supplying unit is carried out with respect to the pressure decrease of the sealed reformer, the pressure decrease being caused by the temperature decrease.

7. The method according to claim 1, wherein:
the method further comprises a step of releasing a part of steam pressure, supplied to the reformer, to an atmosphere during the supply of the steam from the steam supplying unit through a depressurizing device.

8. The method according to claim 7, wherein:
in step (b), during the supply of the steam from the steam supplying unit, a gas discharged from the depressurizing device flows to a combustor configured to heat the reformer, and combustion air is supplied to the combustor by an air supplying device.

9. The method according to claim 1, wherein:
in step (b), a flow of a gas from the reformer to a deodorizer provided on the raw material supplying passage and configured to remove an odorous component in the raw material is blocked by a check valve provided downstream of the deodorizer on the raw material supplying passage.

10. The method according to claim 1, wherein:
in step (b), a flow of a gas from the reformer to a deodorizer provided on the raw material supplying passage and configured to remove an odorous component in the raw material is blocked when a valve body of a solenoid valve, provided downstream of the deodorizer on the raw material supplying passage contacts a valve seat thereof.

11. The method according to claim 1, wherein the reforming catalyst contains an Ni element as a catalyst metal.

12. The method according to claim 1, wherein the raw material contains a hydrocarbon having two or more carbons.

13. A method for operating a fuel cell system, the method comprising steps of:
(a) sealing a reformer by blocking supply of a raw material from a raw material supplying unit to the reformer and supply of steam from a steam supplying unit to the reformer and closing a closing device, the reformer including a reforming catalyst and being configured to cause a reforming reaction between the raw material and the steam to generate a hydrogen-containing gas, the raw material supplying unit being configured to supply the raw material through a raw material supplying passage to the reformer and block the supply of the raw material, the steam supplying unit being configured to supply the steam through a steam supplying passage to the reformer and block the supply of the steam, and the closing device being configured to block a gas passage located downstream of the reformer;
(b) in a state where the reformer is blocked from outside air by closing the closing device, carrying out a pressure compensation operation by using both the supply of the steam from the steam supplying unit and the supply of the raw material from the raw material supplying unit when a pressure of the sealed reformer decreases due to a temperature decrease of the reformer after step (a); and
(c) generating electric power by the fuel cell using the hydrogen-containing gas.

* * * * *